(12) United States Patent
Kajiyama et al.

(10) Patent No.: US 12,078,797 B2
(45) Date of Patent: Sep. 3, 2024

(54) OPTICAL SCANNING DEVICE AND METHOD FOR MANUFACTURING SAME

(71) Applicant: Mitsubishi Electric Corporation, Tokyo (JP)

(72) Inventors: Yoshitaka Kajiyama, Tokyo (JP); Yoshiaki Hirata, Tokyo (JP); Yusuke Shirayanagi, Tokyo (JP); Kozo Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 537 days.

(21) Appl. No.: 17/425,339

(22) PCT Filed: Apr. 3, 2019

(86) PCT No.: PCT/JP2019/014768
§ 371 (c)(1),
(2) Date: Jul. 23, 2021

(87) PCT Pub. No.: WO2020/202491
PCT Pub. Date: Oct. 8, 2020

(65) Prior Publication Data
US 2022/0091410 A1    Mar. 24, 2022

(51) Int. Cl.
*G02B 26/08* (2006.01)
*G02B 26/10* (2006.01)

(52) U.S. Cl.
CPC ....... *G02B 26/0841* (2013.01); *G02B 26/105* (2013.01)

(58) Field of Classification Search
CPC .......................... G02B 26/0841; G02B 26/105
See application file for complete search history.

(56) References Cited

U.S. PATENT DOCUMENTS

| | | | |
|---|---|---|---|
| 5,606,447 A | 2/1997 | Asada et al. | |
| 6,919,980 B2* | 7/2005 | Miyajima | G02B 26/0841 |
| | | | 359/872 |
| 9,423,591 B2* | 8/2016 | Mori | G02B 26/0833 |
| 2007/0047113 A1 | 3/2007 | Davis et al. | |
| 2017/0041511 A1* | 2/2017 | Hino | G09G 3/025 |

FOREIGN PATENT DOCUMENTS

| | | |
|---|---|---|
| JP | 2722314 B2 | 3/1998 |
| JP | 2012-27337 A | 2/2012 |
| JP | 2013-35081 A | 2/2013 |
| JP | 2013-68678 A | 4/2013 |
| JP | 2014-41234 A | 3/2014 |
| JP | 2016-143020 A | 8/2016 |

OTHER PUBLICATIONS

International Search Report and Written Opinion mailed on May 14, 2019, received for PCT Application PCT/JP2019/014768, Filed on Apr. 3, 2019, 9 pages including English Translation.

* cited by examiner

*Primary Examiner* — Euncha P Cherry
(74) *Attorney, Agent, or Firm* — XSENSUS LLP

(57) ABSTRACT

An optical scanning device includes a first structure and a second structure. The first structure includes a support, a driver, a first columnar body, a driving section, and a pair of beams. The support includes a support body and a flat section. The pair of beams connects the driver and the flat section. The driving section includes a coil, a pair of electrode pads, and a magnet. The second structure is provided with a reflector.

18 Claims, 22 Drawing Sheets

OPTICAL SCANNING DEVICE AND METHOD FOR MANUFACTURING SAME

CROSS-REFERENCE TO RELATED APPLICATION

The present application is based on PCT filing PCT/JP2019/014768, filed Apr. 3, 2019, the entire contents of which are incorporated herein by reference.

TECHNICAL FIELD

The present invention relates to an optical scanning device and a method for manufacturing the same.

BACKGROUND ART

An optical scanning device is used for a laser distance sensor, a projector, or the like. A micro electro mechanical systems (MEMS) mirror type optical scanning device to which a MEMS technology is applied is known as the optical scanning device. This type of optical scanning device is considered to be compact and capable of performing driving with high accuracy. In general, such an optical scanning device includes a support, a rotation body, a reflection surface, and a beam. The reflection surface is formed on the rotation body. The beam connects the support and the rotation body.

In the optical scanning device, electromagnetic force, electrostatic force, or the like is used as driving force. The rotation body rotates about the beam by the electromagnetic force or the electrostatic force. Light irradiated to the reflection surface disposed on the rotation body is scanned when the rotation body rotates. Silicon is mainly applied as a material of the optical scanning device. The optical scanning device is manufactured by applying a semiconductor process such as dry etching to the silicon.

For example, PTL 1 and PTL 2 disclose this type of optical scanning device. PTL 1 proposes a general MEMS mirror type optical scanning device. PTL 2 proposes an optical scanning device in which a support column is disposed between a reflector and a rotation body in addition to a configuration of the general MEMS mirror type optical scanning device. In PTL 2, the reflector is bonded onto a rotation body with the support column interposed therebetween to form a three-dimensional structure, so that downsizing of the optical scanning device is attained.

CITATION LIST

Patent Literature

PTL 1: Japanese Patent No. 2722314
PTL 2: Japanese Patent Laying-Open No. 2013-68678

SUMMARY OF INVENTION

Technical Problem

As described above, the downsizing of the optical scanning device is demanded. The present invention has been made as a part of such development, one object of the present invention is to provide an optical scanning device that can be downsized, and another object is to provide a method for manufacturing the optical scanning device.

Solution to Problem

An optical scanning device according to one aspect of the present invention is an optical scanning device including a first structure and a second structure. The first structure includes a support, a driver, a first columnar body, and a driving section. The driver is rotatably connected to the support with a beam interposed therebetween. The first columnar body is connected to the driver. The driving section rotates the driver about the beam. The second structure includes a reflector and a second columnar body. The reflector is disposed so as to face the support. The second columnar body is connected to the reflector and is connected to the first columnar body. The beam is disposed in a portion of the support opposite to a side where the second structure is disposed.

A method for manufacturing a semiconductor device according to another aspect of the present invention is a method for manufacturing an optical scanning device having a first structure and a second structure. The process of forming the first structure includes the following processes. A first substrate in which a first semiconductor layer, a first insulating film, a second semiconductor layer, and a second insulating film are sequentially stacked is prepared. A driving section is formed on a side of the second insulating film in the first substrate. The second insulating film and the second semiconductor layer are processed, and a driver driven by a driving section, a flat section, and a beam connecting the driver and the flat section are formed by respective parts of the second insulating film and the second semiconductor layer. The first semiconductor layer and the first insulating film are processed, and a support including a support body connected to the flat section and a first columnar body connected to the driver are formed by respective parts of the first insulating film and the first semiconductor layer. The process of forming the second structure includes the following processes. A second substrate in which a third semiconductor layer, a third insulating film, a fourth semiconductor layer, and a fourth insulating film are sequentially stacked is prepared. The third semiconductor layer and the third insulating film are processed, a reflector is formed by respective parts of the fourth semiconductor layer and the fourth insulating film, and a second columnar body connected to the reflector is formed by respective parts of the third semiconductor layer and the third insulating film. After the first structure and the second structure are formed, the first columnar body and the second columnar body are bonded together such that the reflector faces the support.

Advantageous Effects of Invention

According to the optical scanning device of the present invention, the reflector of the second structure is disposed so as to face the support of the first structure. The beam connecting the support and the driver is disposed in a part of the support opposite to a side where the second structure is disposed. This can contribute to the downsizing of the optical scanning device.

According to the method for manufacturing the optical scanning device according to the present invention, after the first structure and the second structure are formed, the first columnar body of the first structure and the second columnar body of the second structure are bonded such that a reflector faces the support. Consequently, a semiconductor device that can contribute to the downsizing can be manufactured.

DESCRIPTION OF EMBODIMENTS

First Embodiment

Figure 1:
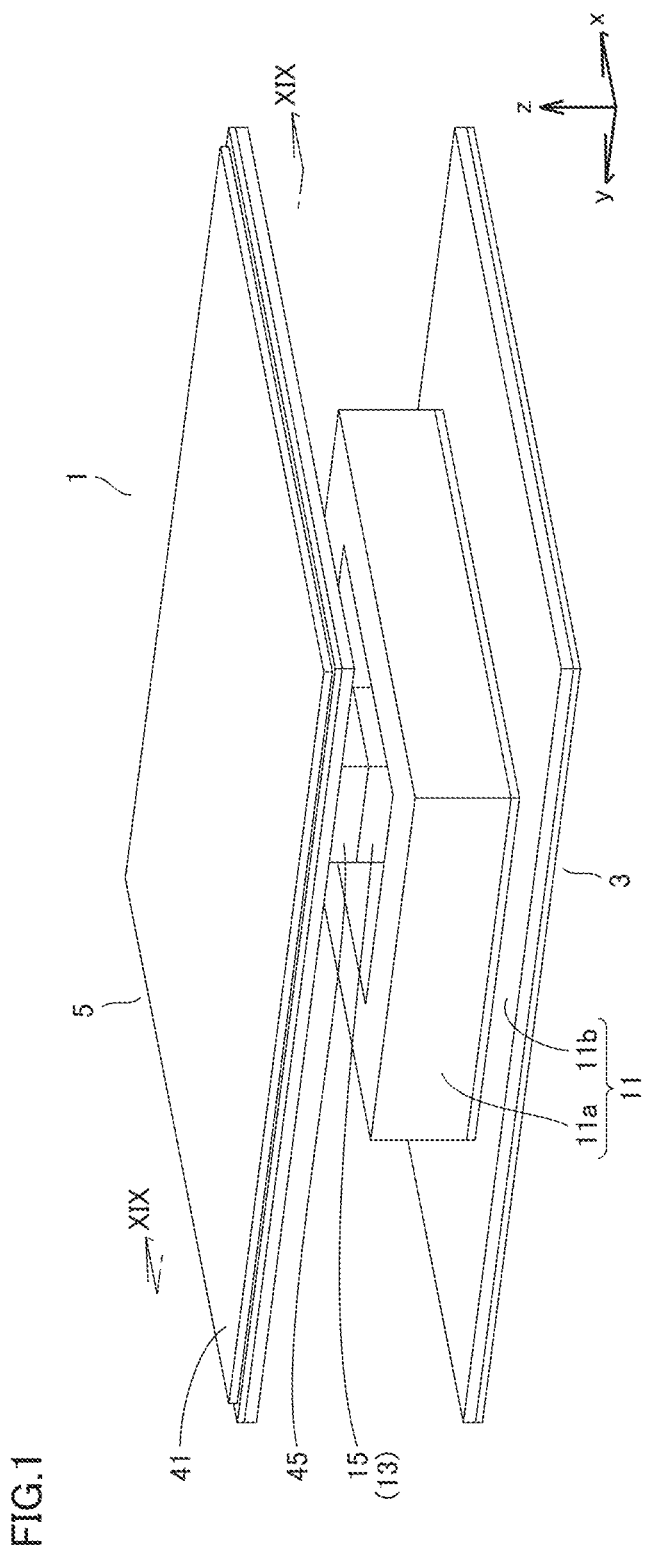
FIG. 1 is a first perspective view illustrating an optical scanning device according to a first embodiment.
Figure 2:
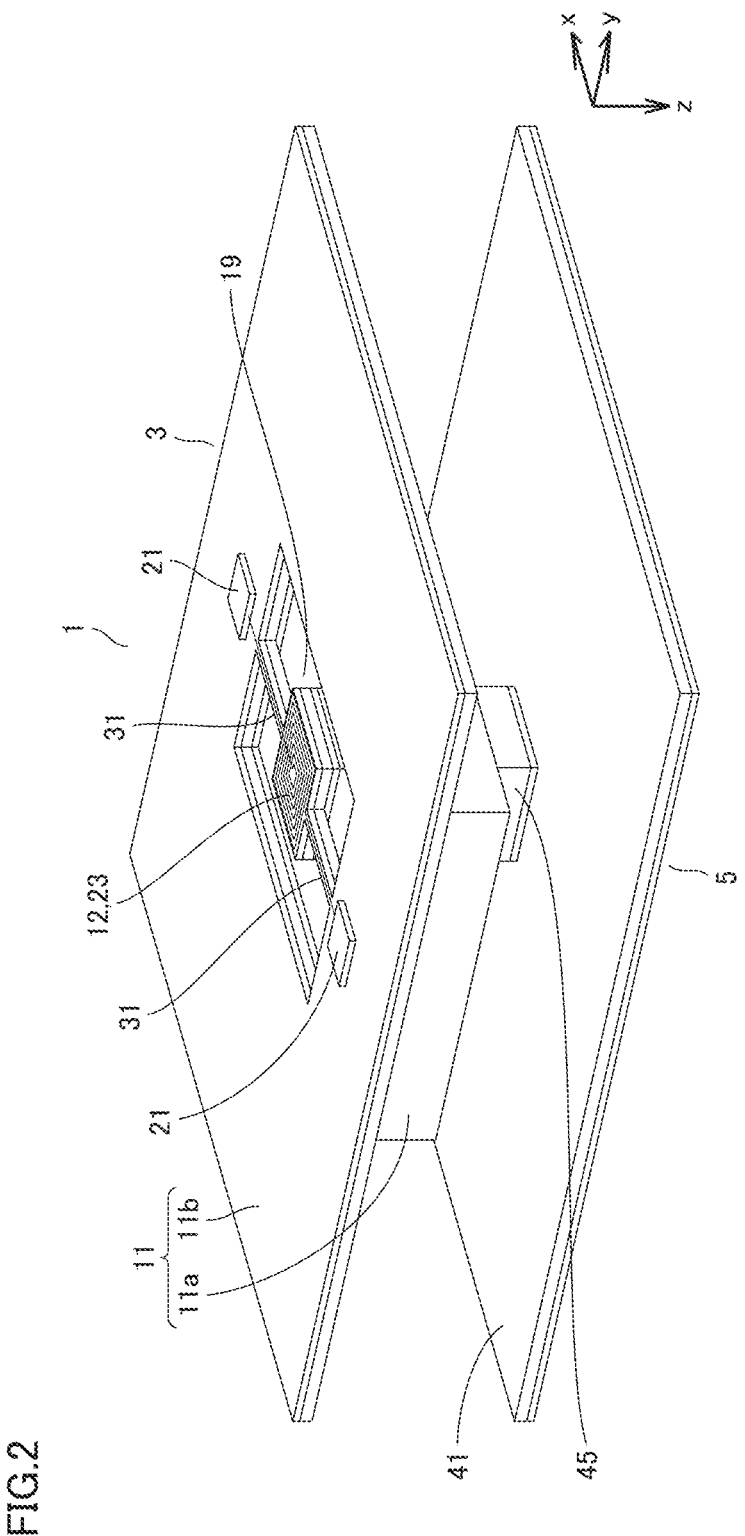
FIG. 2 is a second perspective view illustrating the optical scanning device of the first embodiment.

An optical scanning device according to a first embodiment will be described below. As illustrated in FIGS. 1 and 2, an optical scanning device 1 of the first embodiment includes a first structure 3 and a second structure 5. A reflector 41 is provided in second structure 5. As will be described later, reflector 41 is driven by a driving section 19 provided in first structure 3.

Figure 3:
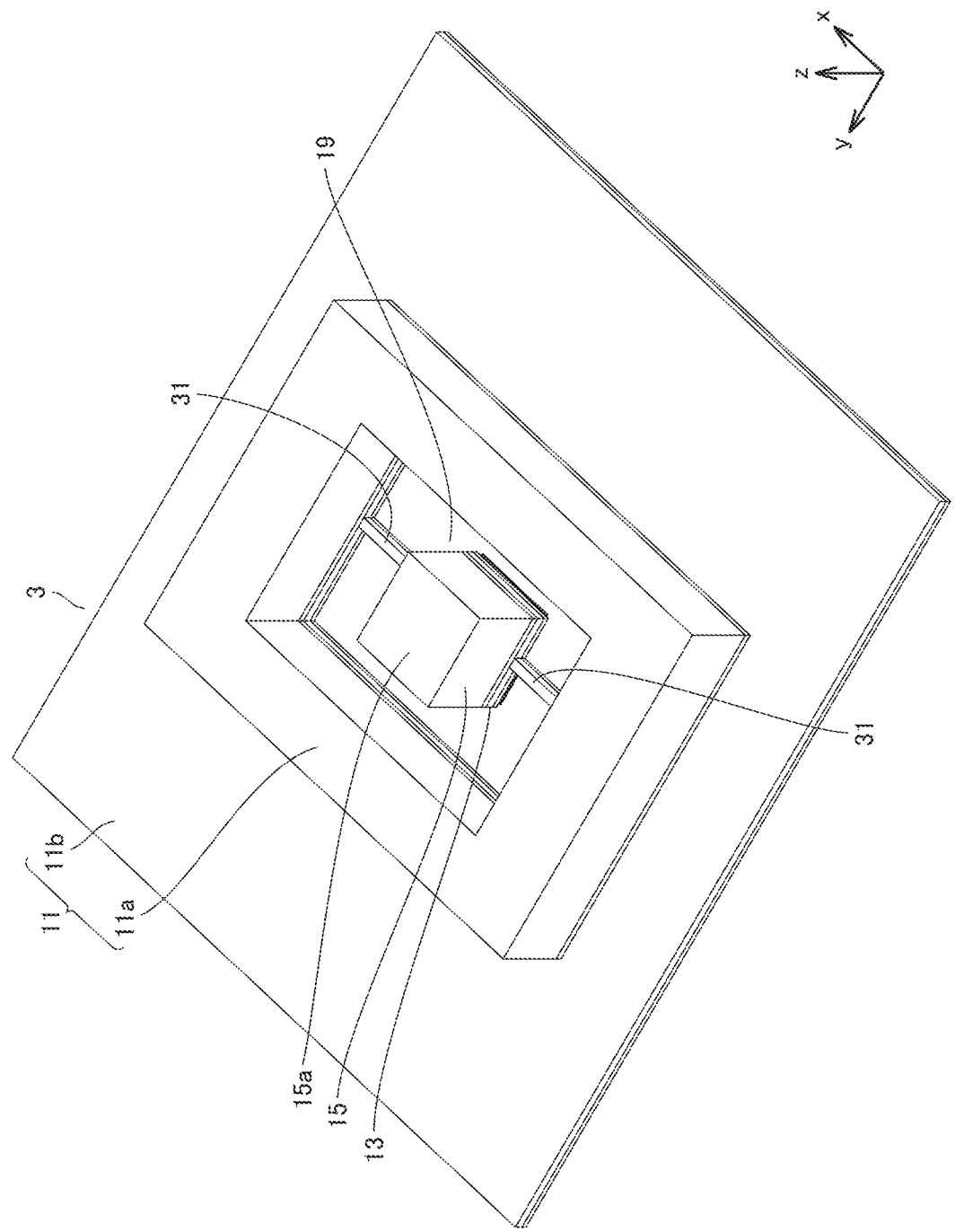
FIG. 3 is a first perspective view illustrating a first structure in the optical scanning device of the first embodiment.
Figure 4:
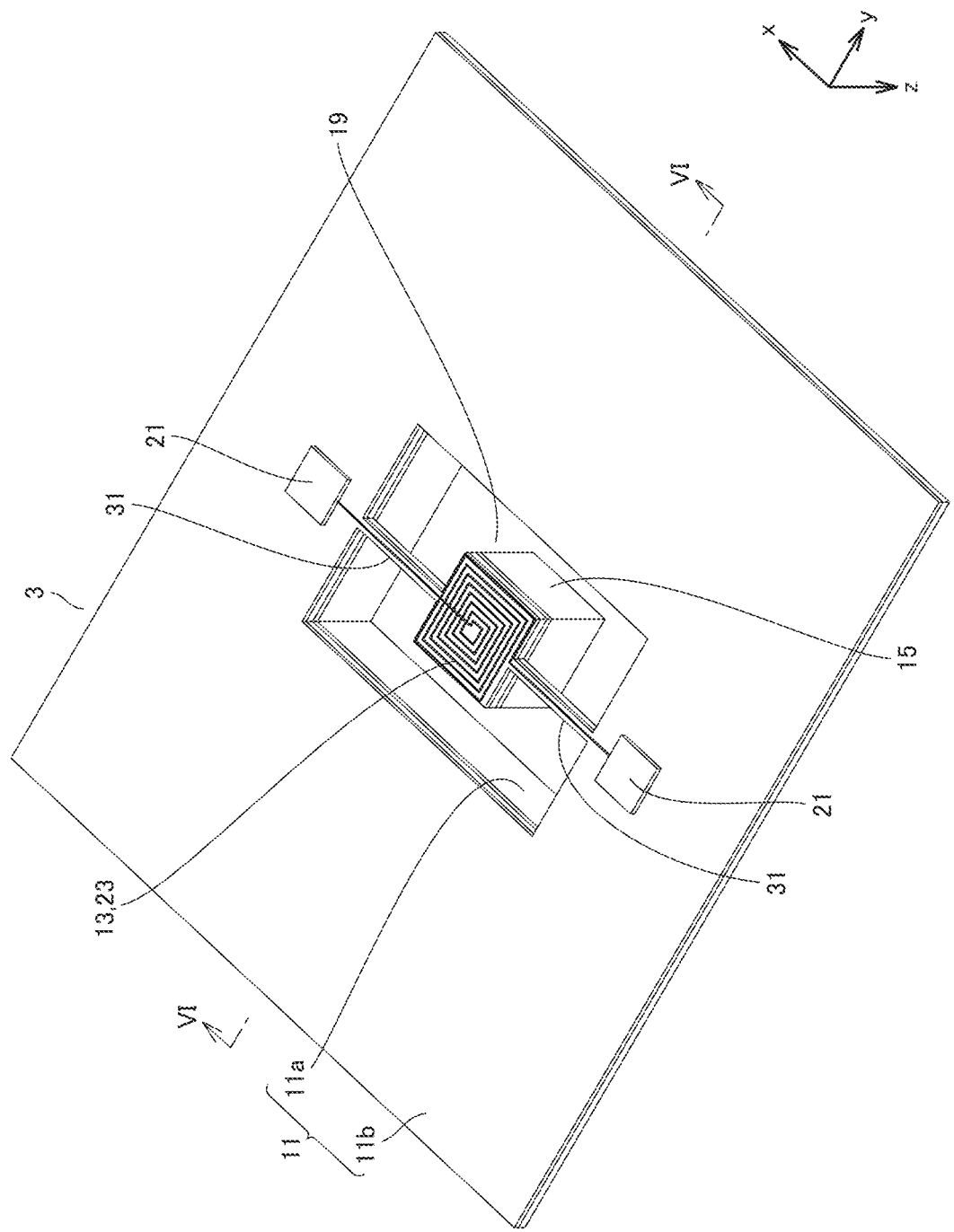
FIG. 4 is a second perspective view illustrating the first structure in the optical scanning device of the first embodiment.
Figure 5:
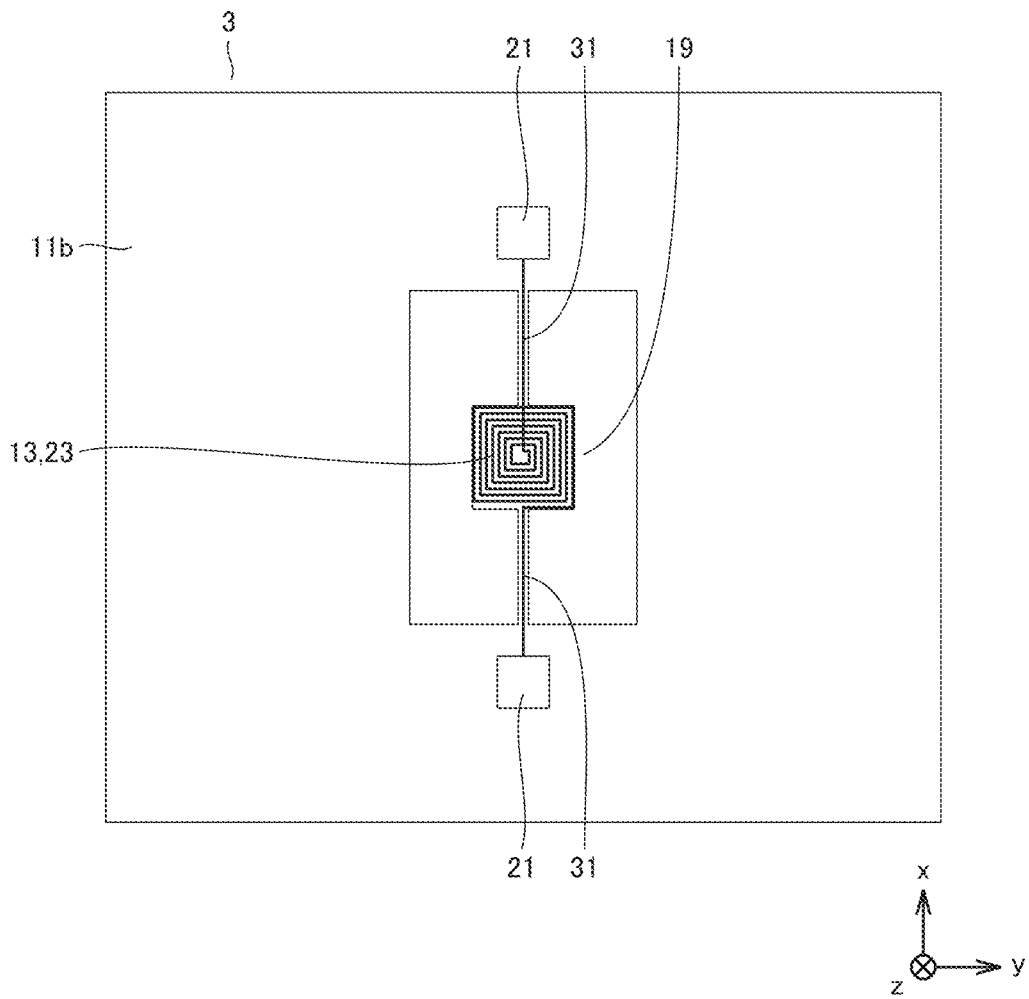
FIG. 5 is a plan view illustrating the first structure in the optical scanning device of the first embodiment when the first structure is viewed from a back side.

First structure 3 will be described in detail. As illustrated in FIGS. 3, 4, and 5, first structure 3 includes a support 11, a driver 13, a first columnar body 15, driving section 19, and a pair of beams 31. Support 11 includes a support body 11a and a flat section 11b. One beam 31 of the pair of beams 31 connects one side of driver 13 and flat section 11b. The other beam 31 of the pair of beams 31 connects the other side of driver 13 and flat section 11b.

Figure 20:
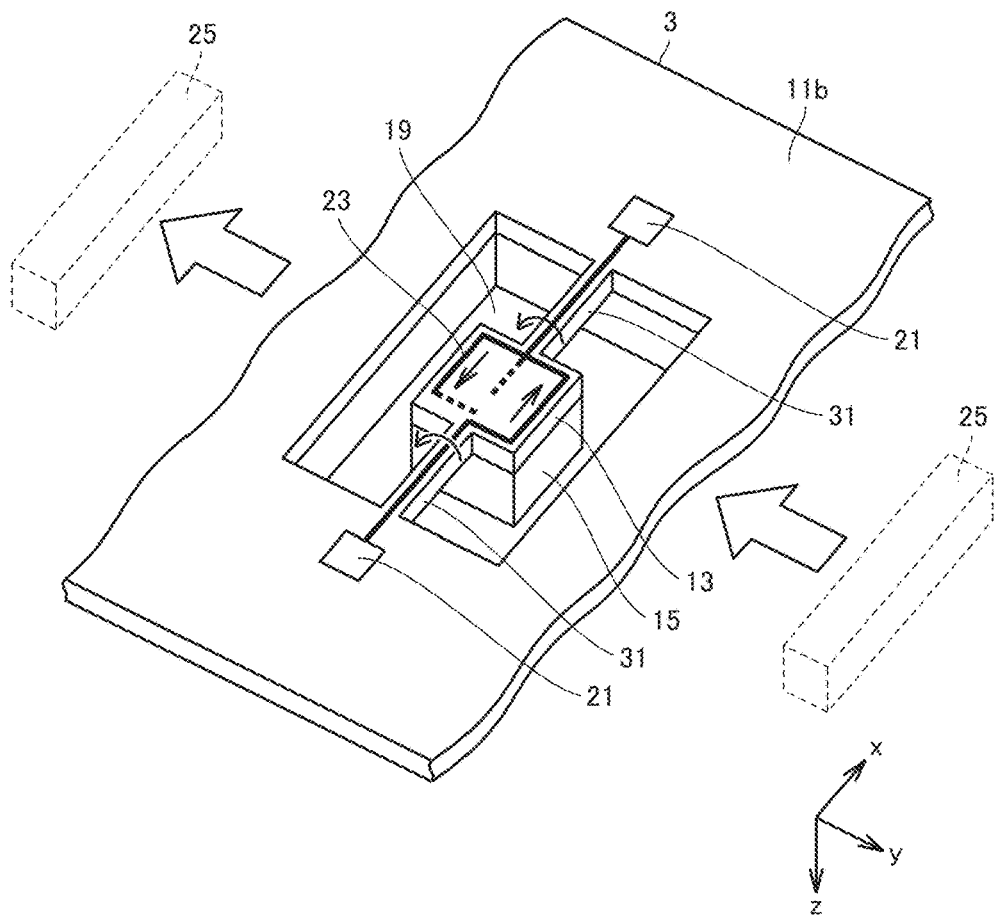
FIG. 20 is a partial perspective view illustrating operation of the optical scanning device of the first embodiment.

Driving section 19 includes a coil 23, a pair of electrode pads 21, and a magnet 25 (see FIG. 20). A main part of coil 23 as a coil is disposed in driver 13. The pair of electrode pads 21 is disposed on flat section 11b. One end side of coil 23 is electrically connected to one electrode pad 21 of the pair of electrode pads 21. The other end side of coil 23 is electrically connected to the other electrode pad 21 of the pair of electrode pads 21.

Driver 13 rotates about beam 31 by Lorentz force generated by action of current flowing through coil 23 and magnetic lines of force of magnet 25. First columnar body 15 is connected to driver 13.

Figure 6:
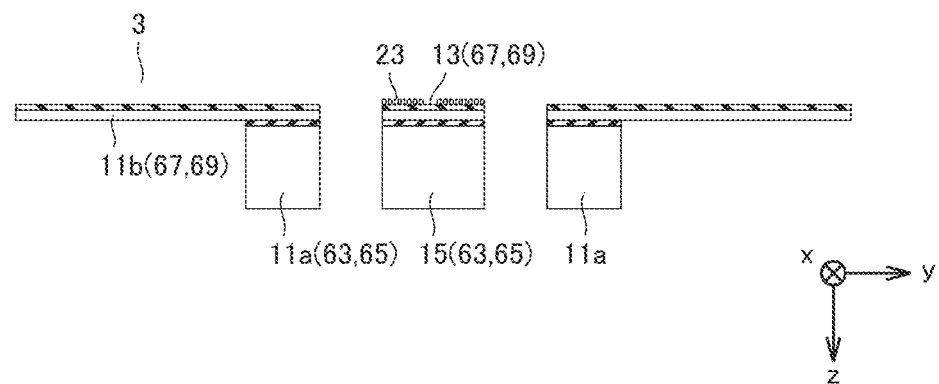
FIG. 6 is a sectional view taken along a line VI-VI in FIG. 4 in the first embodiment.

As described later, first structure 3 is formed by processing a first SOI substrate 61 (see FIG. 10) in which a first semiconductor layer 63, a first insulating film 65, and a second semiconductor layer 67 are stacked and a second insulating film 69. For example, second insulating film 69 is a thermal oxide film formed so as to be in contact with second semiconductor layer 67. As illustrated in FIG. 6, flat section 11b and driver 13 are formed of second semiconductor layer 67 and second insulating film 69. Support body 11a and first columnar body 15 are formed of first semiconductor layer 63 and first insulating film 65.

Figure 7:
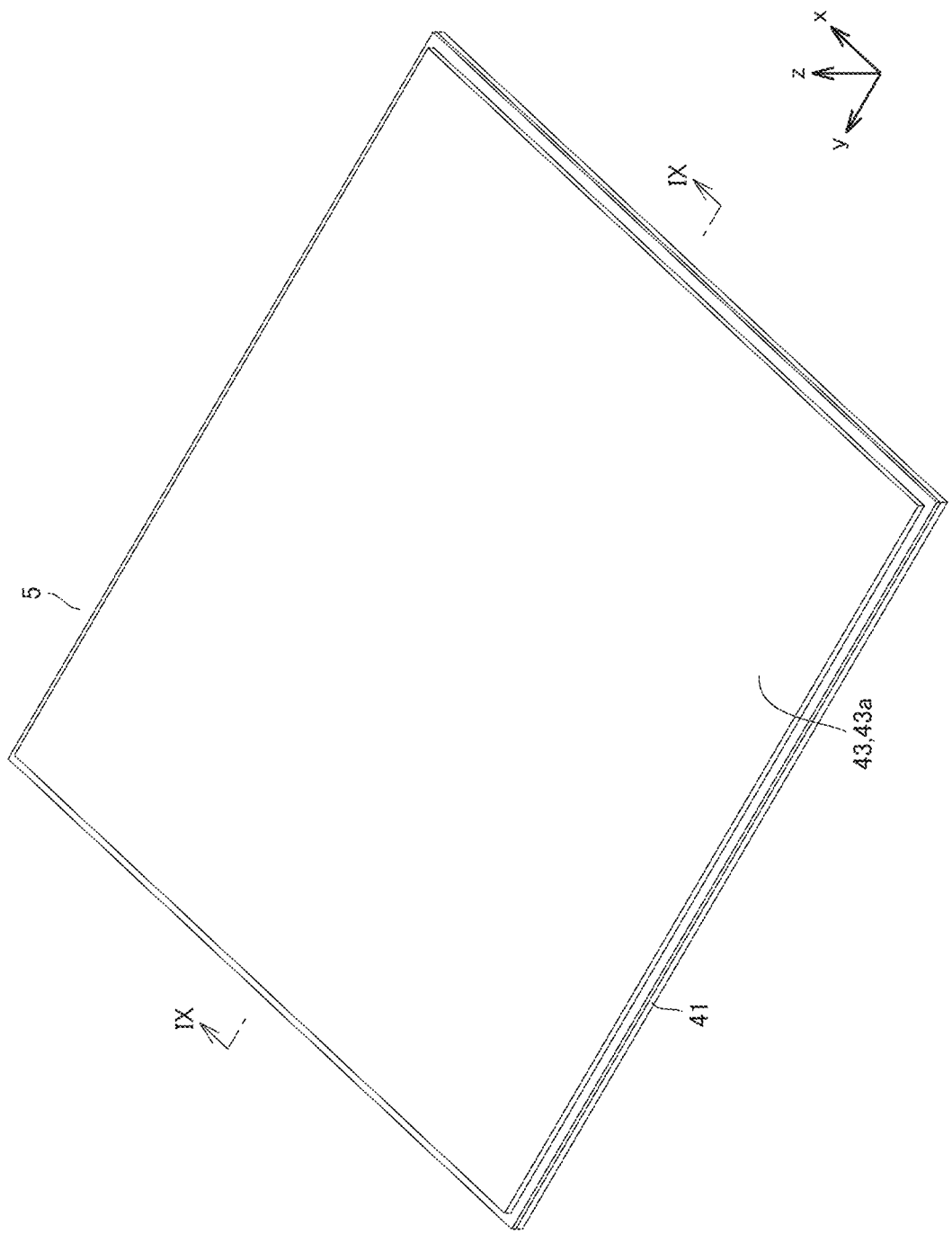
FIG. 7 is a first perspective view illustrating a second structure in the optical scanning device of the first embodiment.
Figure 8:
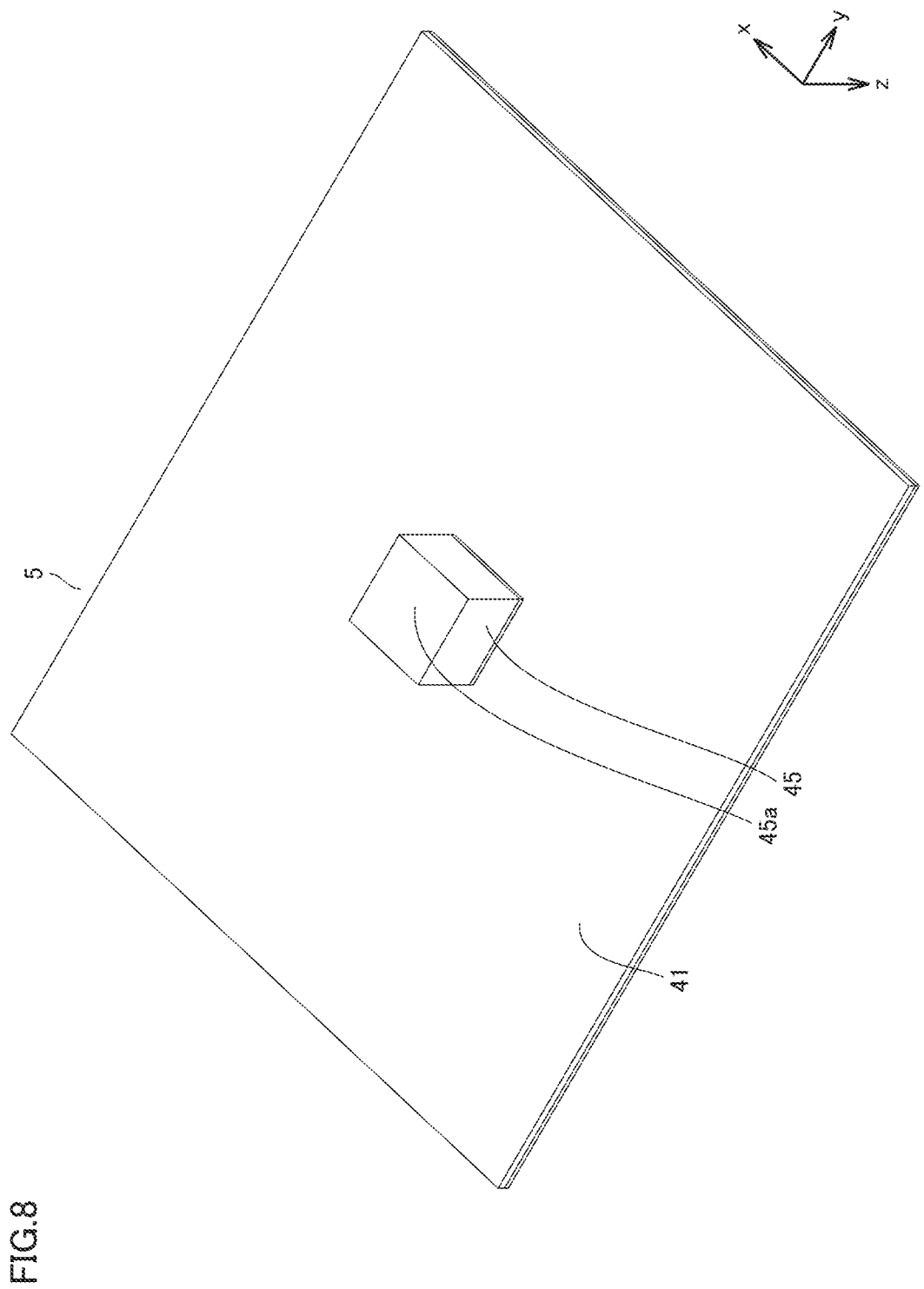
FIG. 8 is a second perspective view illustrating the second structure in the optical scanning device of the first embodiment.

Then, second structure 5 will be described in detail. As illustrated in FIGS. 7 and 8, second structure 5 includes reflector 41 and a second columnar body 45. A metal film 43 is formed on reflector 41. In reflector 41, metal film 43 is formed on a side opposite to a side on which first structure 3 is disposed. Metal film 43 includes a reflection surface 43a.

Figure 9:
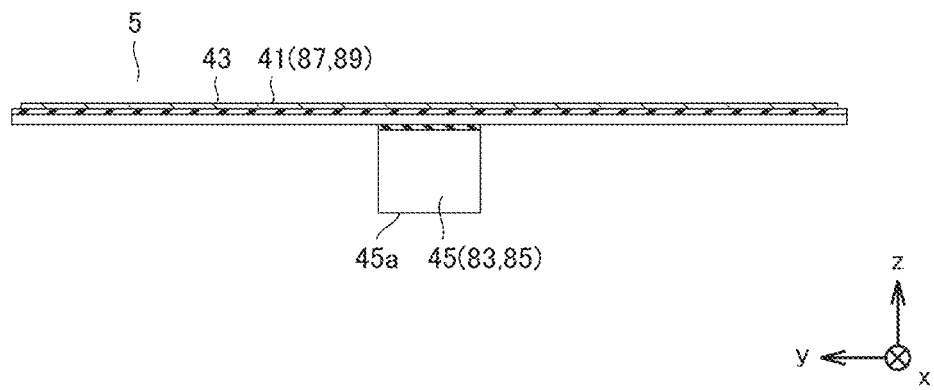
FIG. 9 is a sectional view taken along a section line IX-IX in FIG. 7 in the first embodiment.

As described later, second structure 5 is formed by processing a second SOI substrate 81 (see FIG. 14) in which a third semiconductor layer 83, a third insulating film 85, and a fourth semiconductor layer 87 are stacked and a fourth insulating film 89. For example, fourth insulating film 89 is a thermal oxide film formed so as to be in contact with fourth semiconductor layer 87. As illustrated in FIG. 9, reflector 41 is formed of fourth semiconductor layer 87 and fourth insulating film 89. Second columnar body 45 is formed of third semiconductor layer 83 and third insulating film 85.

Second columnar body 45 of second structure 5 is bonded to first columnar body 15 of first structure 3. Specifically, a bonding surface 45a (see FIG. 8) of second columnar body 45 is bonded to a bonding surface 15a (see FIG. 3) of first columnar body 15. In association with rotational movement of driver 13, first columnar body 15 and second columnar body 45 are inclined, so that reflector 41 is inclined at a desired angle. Specific operation of optical scanning device 1 will be described later.

Figure 10:
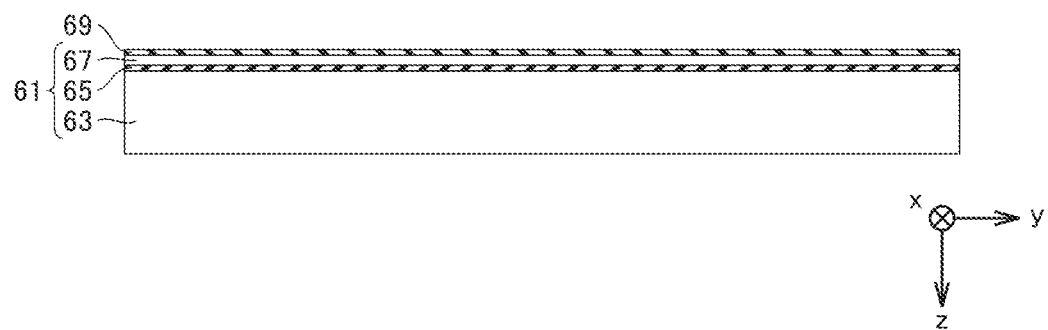
FIG. 10 is a sectional view illustrating one process of a method for manufacturing the first structure in the optical scanning device of the first embodiment.

An example of a method for manufacturing optical scanning device 1 will be described below. First, an example of a method for manufacturing first structure 3 will be described. As illustrated in FIG. 10, first SOI substrate 61 in which first semiconductor layer 63, first insulating film 65, and second semiconductor layer 67 are stacked is prepared. For example, second insulating film 69 is formed on the surface of second semiconductor layer 67 by a thermal oxidation method. For example, each of first insulating film 65 and second insulating film 69 is a silicon oxide film (thermal oxide film). For example, each of the first semiconductor layer 63 and second semiconductor layer 67 is a silicon layer.

In other words, the following is obtained. First semiconductor layer 63 is a silicon substrate serving as a base. First insulating film 65 is a buried oxide (BOX) layer made of a silicon oxide film formed so as to be in contact with the silicon substrate. Second semiconductor layer 67 is a silicon layer formed so as to be in contact with the BOX layer. For example, first semiconductor layer 63 has a film thickness of about 500 μm. For example, second semiconductor layer 67 has a film thickness of about 50 μm. First semiconductor layer 63 has the film thickness greater than or equal to 10 times of the film thickness of second semiconductor layer 67.

Figure 11:
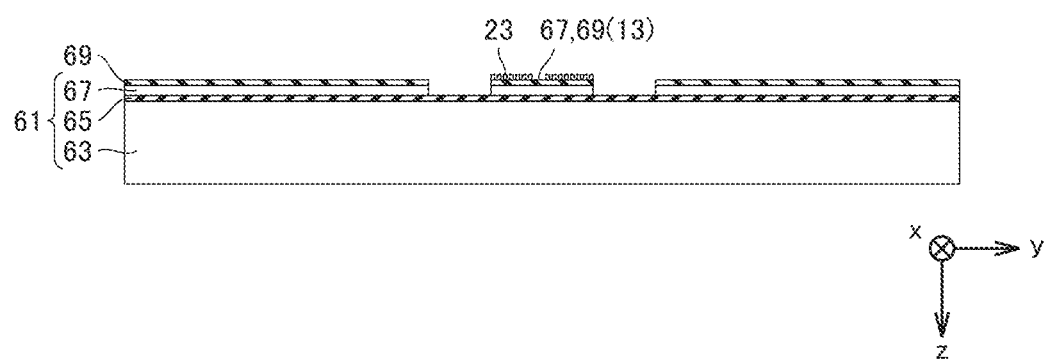
FIG. 11 is a sectional view illustrating a process performed after the process in FIG. 10 in the first embodiment.

Coil 23 is formed on second insulating film 69. A metal film (not illustrated) having good conductivity such as aluminum (Al) or aluminum nitride (AlN) is formed by, for example, a sputtering method so as to cover second insulating film 69. Then, photomechanical processing and etching processing are performed. Consequently, as illustrated in FIG. 11, coil 23 is formed in a region of second insulating film 69 where the driver is to be formed.

At this time, the pair of electrode pads 21 (see FIG. 2 or 4) is also formed simultaneously with coil 23. The film (material) of coil 23 and electrode pad 21 is not limited to aluminum or the like as long as the film has sufficient conductivity and good adhesion with the base film or the like, and another film may be applied.

Wet etching processing in which an etchant is used or dry etching processing such as reactive ion etching (RIE) is performed as the etching processing of the metal film. In any etching processing, an etching condition under which an etching rate of the metal film is sufficiently higher than an etching rate of second insulating film 69 (base film) and selectivity is large is selected. A photolithography technique using a resist film as a protective film is suitable for the etching processing. For example, oxygen ashing processing or the like is applied in order to remove the resist film.

Then, driver 13 and flat section 11b are formed. A pattern (not illustrated) of the resist film is formed by performing the photomechanical processing. Then, second insulating film 69 and second semiconductor layer 67 are etched using the pattern of the resist film as the protective film. At this point, second semiconductor layer 67 is patterned using the pattern of the resist film in patterning second insulating film 69 and a part of second insulating film 69 as the protective film.

Deep reactive ion etching (DRIE) processing by a Bosch method capable of performing the etching processing with a high aspect ratio is desirable as the etching processing. The etching processing is performed until first insulating film 65 is exposed. Consequently, as illustrated in FIG. 11, a part that becomes driver 13 and a part that becomes flat section 11b are patterned by the second semiconductor layer and the second insulating film.

Figure 12:
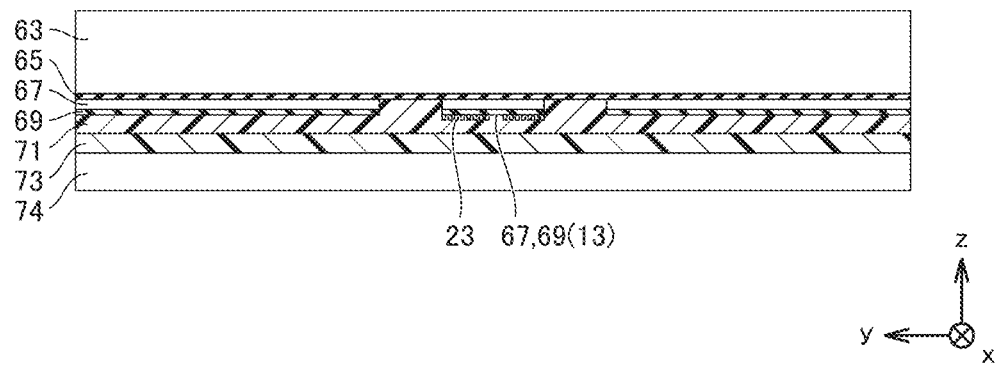
FIG. 12 is a sectional view illustrating a process performed after the process in FIG. 11 in the first embodiment.

Then, as illustrated in FIG. 12, a first protective resist film 71 is formed by, for example, a spin coating method so as to cover second insulating film 69. Then, a first dummy wafer 74 is stuck to first protective resist film 71 with a first wax 73.

Then, first columnar body 15 and support body 11a are formed. A pattern (not illustrated) of the resist film is formed by performing the photomechanical processing. Then, the etching processing is performed on first semiconductor layer 63 and first insulating film 65 using the pattern of the resist film as the protective film.

The etching processing of first semiconductor layer 63 is desirably performed by the deep etching processing. After first semiconductor layer 63 is patterned, first insulating film 65 is patterned by wet etching processing or dry etching processing using the pattern of the resist film as the protective film.

Figure 13:
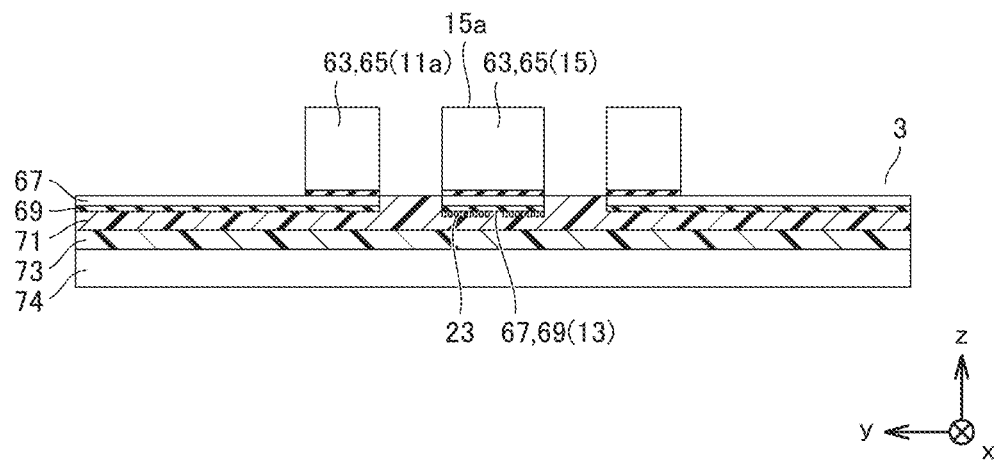
FIG. 13 is a sectional view illustrating a process performed after the process in FIG. 12 in the first embodiment.

Consequently, as illustrated in FIG. 13, support 11 including driver 13, first columnar body 15, flat section 11b, and support body 11a and beam 31 (see FIG. 3) connecting driver 13 and support 11 are formed. In this way, first structure 3 supported by first dummy wafer 74 is formed.

Figure 14:
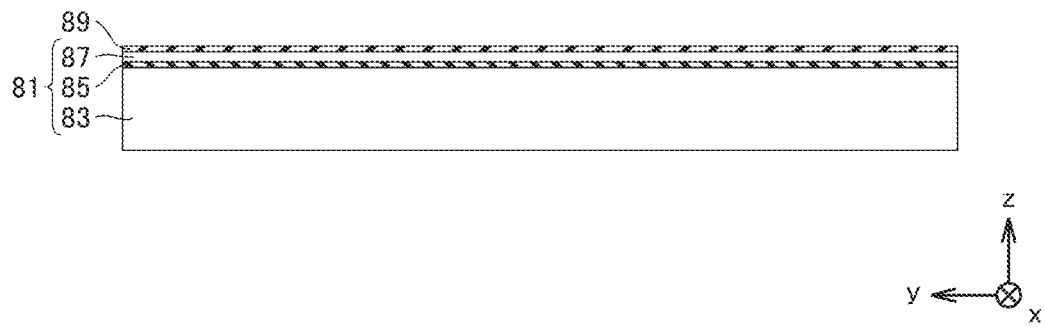
FIG. 14 is a sectional view illustrating one process of the method for manufacturing the second structure in the optical scanning device of the first embodiment.

Then, an example of a method for manufacturing second structure 5 will be described. As illustrated in FIG. 14, a second SOI substrate 81 in which third semiconductor layer 83, third insulating film 85, and fourth semiconductor layer 87 are stacked is prepared. For example, fourth insulating film 89 is formed on the surface of fourth semiconductor layer 87 by a thermal oxidation method. For example, third insulating film 85 and fourth insulating film 89 are a silicon oxide film (thermal oxide film). For example, each of third semiconductor layer 83 and fourth semiconductor layer 87 is a silicon layer.

In other words, the following is obtained. Third semiconductor layer 83 is a silicon substrate as a base. Third insulating film 85 is the BOX layer formed so as to be in contact with the silicon substrate. Fourth semiconductor layer 87 is a silicon layer formed so as to be in contact with the BOX layer. For example, third semiconductor layer 83 has the film thickness of about 500 μm. For example, fourth semiconductor layer 87 has the film thickness of about 50 μm. Third semiconductor layer 83 has the film thickness greater than or equal to 10 times of the film thickness of fourth semiconductor layer 87.

Figure 15:
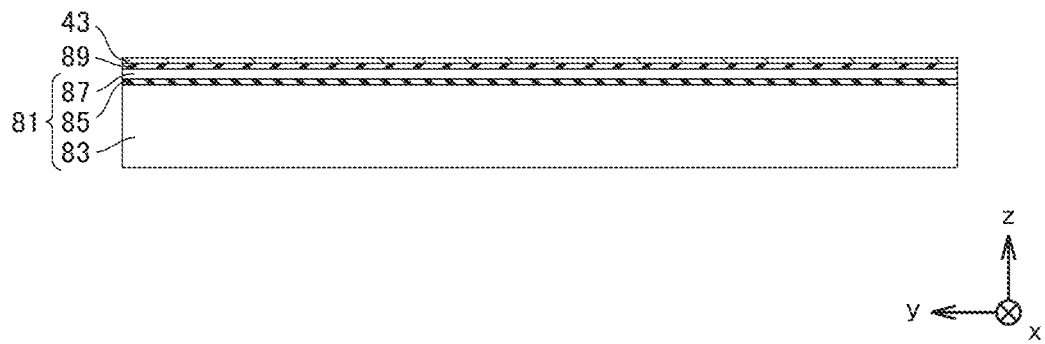
FIG. 15 is a sectional view illustrating a process performed after the process in FIG. 14 in the first embodiment.

Then, as illustrated in FIG. 15, metal film 43 having reflection surface 43a is formed by, for example, a sputtering method so as to cover fourth insulating film 89. Then, the photomechanical processing is performed to form a pattern (not illustrated) of the resist film. Then, the metal film is etched using the pattern of the resist film as the protective film.

A metal film having a high reflectance with respect to a wavelength of light to be scanned is desirable as the metal film having the reflection surface. For example, when the light to be scanned is infrared light, a gold (Au) film is suitable. In the case of forming the gold film, it is desirable to interpose a film enhancing adhesion with a base between the gold film and the base. For example, chromium (Cr) film/nickel (Ni) film/gold film or titanium (Ti) film/platinum (Pt) film/gold film is preferable.

The wet etching processing using the etchant or the dry etching processing such as the reactive ion etching is performed for the etching processing of the metal film. In any etching processing, an etching condition under which the etching rate of the metal film is sufficiently larger than the etching rate of fourth insulating film 89 (base film) and the selectivity is large is selected.

Figure 16:
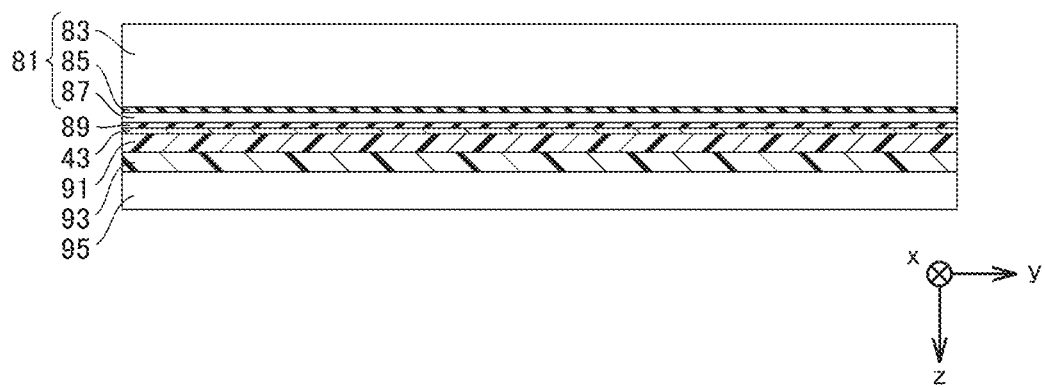
FIG. 16 is a sectional view illustrating a process performed after the process in FIG. 15 in the first embodiment.

Then, as illustrated in FIG. 16, a second protective resist film 91 is formed so as to cover metal film 43 by, for example, a spin coating method. Then, a second dummy wafer 95 is stuck to second protective resist film 91 with a second wax 93.

Then, second columnar body 45 and reflector 41 are formed. A resist film pattern (not illustrated) is formed by performing the photomechanical processing. Then, third semiconductor layer 83 and third insulating film 85 are etched using the pattern of the resist film as the protective film.

Figure 17:
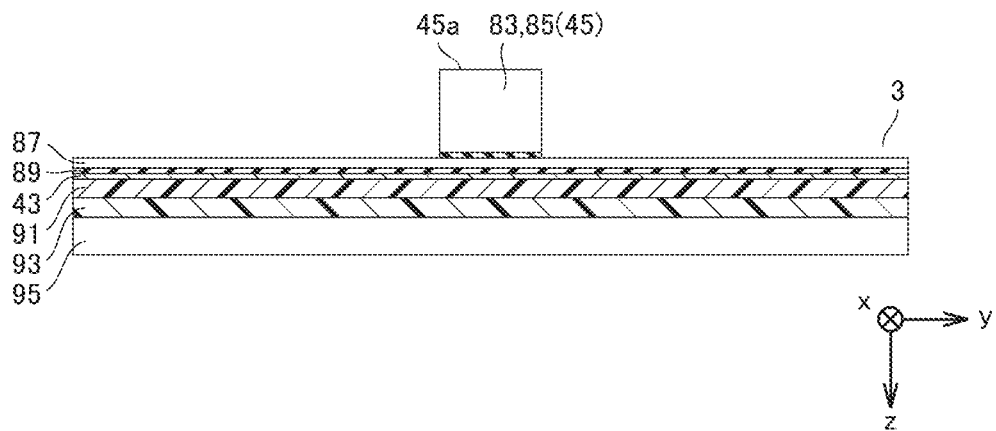
FIG. 17 is a sectional view illustrating a process performed after the process in FIG. 16 in the first embodiment.

The etching processing of third semiconductor layer 83 is desirably performed by the deep etching processing. After third semiconductor layer 83 is patterned, third insulating film 85 is patterned by the wet etching processing or the dry etching processing using the pattern of the resist film as the protective film. Consequently, as illustrated in FIG. 17, second columnar body 45 and reflector 41 connected to second columnar body 45 are formed. In this way, second structure 5 supported by second dummy wafer 95 is formed.

Figure 18:
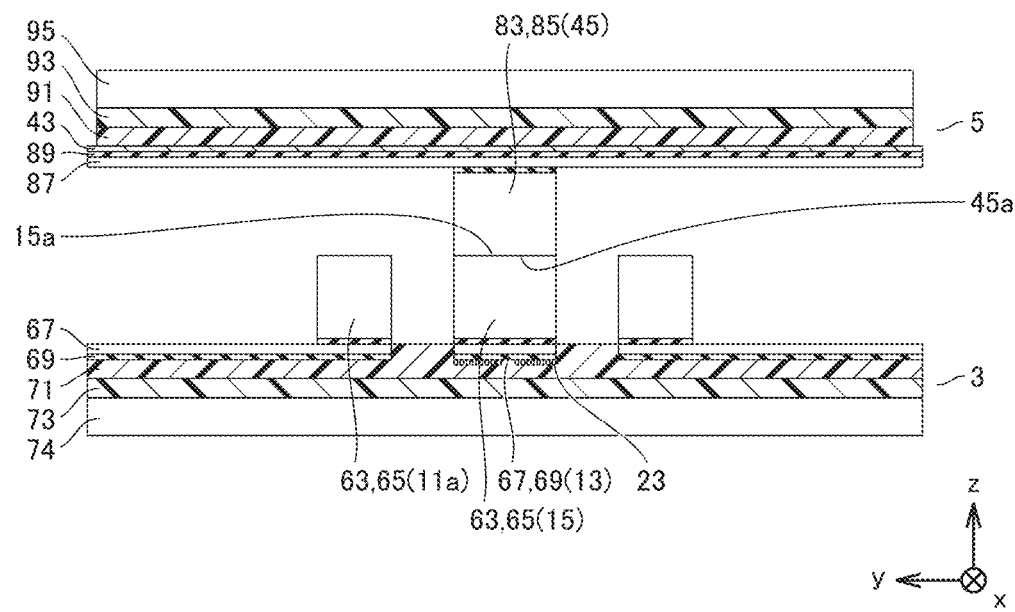
FIG. 18 is a sectional view illustrating a process performed after the process in FIG. 13 and the process in FIG. 17 in the first embodiment.

Then, first structure 3 and second structure 5 are bonded together. As illustrated in FIG. 18, bonding surface 15a in first columnar body 15 (first semiconductor layer 63) of first structure 3 and bonding surface 45a in second columnar body 45 (third semiconductor layer) of second structure 5 are bonded together. In order not to damage metal film 43 that becomes reflection surface 43a due to a high temperature, it is desirable to use normal temperature activation bonding, plasma activation bonding, or the like.

Figure 19:
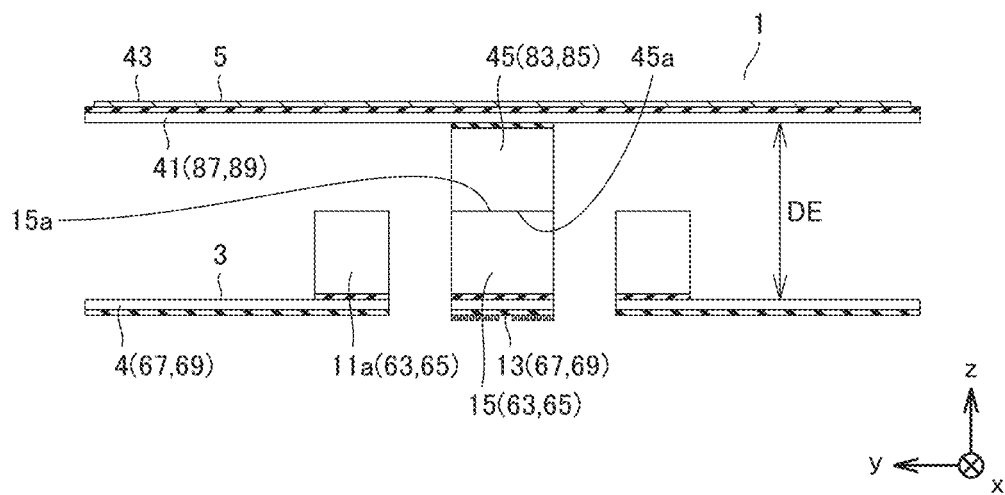
FIG. 19 is a sectional view illustrating a process performed after the process in FIG. 18 in the first embodiment.

Then, first wax 73 and second wax 93 are melted by immersing bonded first structure 3 and second structure 5 in, for example, isopropyl alcohol at a desired temperature. Consequently, first dummy wafer 74 is peeled off from first structure 3. Second dummy wafer 95 is peeled off from second structure 5 (see FIG. 19). Then, first protective resist film 71 and second protective resist film 91 are removed by performing processing with a resist stripper or oxygen ashing processing. Thus, as illustrated in FIG. 19, the main part of optical scanning device 1 is completed.

The operation of optical scanning device 1 described above will be described below. In optical scanning device 1, driver 13 is driven by the Lorentz force. As illustrated in FIG. 20, for example, magnet 25 (permanent magnet) is disposed so as to generate a magnetic field in a Y-axis direction (negative direction). When current flows in coil 23 disposed in the magnetic field in a direction indicated by an arrow, the Lorentz force is generated, and driver 13 rotates in the direction indicated by the arrow with beam 31 as a rotation axis.

Figure 21:
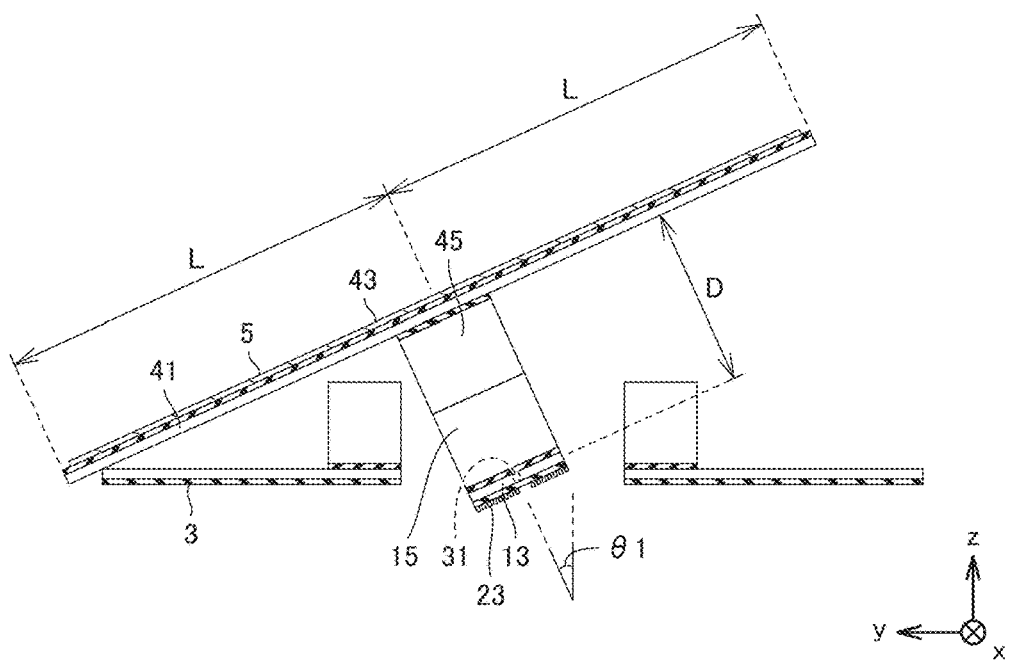
FIG. 21 is a sectional view illustrating one state in which a reflector of the optical scanning device of the first embodiment is inclined.

As illustrated in FIG. 21, when driver 13 rotates, first columnar body 15 and second columnar body 45 that are connected to driver 13 are inclined, and reflector 41 is inclined. By changing the direction of the current flowing through coil 23, reflector 41 is inclined to the side opposite to the direction in FIG. 21. An angle at which reflector 41 is inclined is adjusted by an amount of current flowing through coil 23 and strength of the magnetic field.

According to optical scanning device 1, second structure 5 including reflector 41 is disposed so as to face first structure 3 that drives reflector 41. This can contribute to downsizing of optical scanning device 1.

In optical scanning device 1, a range of the angle at which reflector 41 of second structure 5 is inclined with respect to first structure 3 can further be expanded. This will be described below. In optical scanning device 1 described above, for example, a length L that is a half of a length of reflector 41 in the Y-axis direction is set to 5000 μm, and a distance D from reflector 41 to beam 31 is set to 1000 μm. Consequently, as illustrated in FIG. 21, an inclination angle θ1 becomes arctan(1000/5000)≈11.3°. The length of reflector 41 in the Y-axis direction refers to the length of reflector 41 parallel to the Y-axis (for example, see FIG. 19). The same applies to a comparative example.

Figure 22:
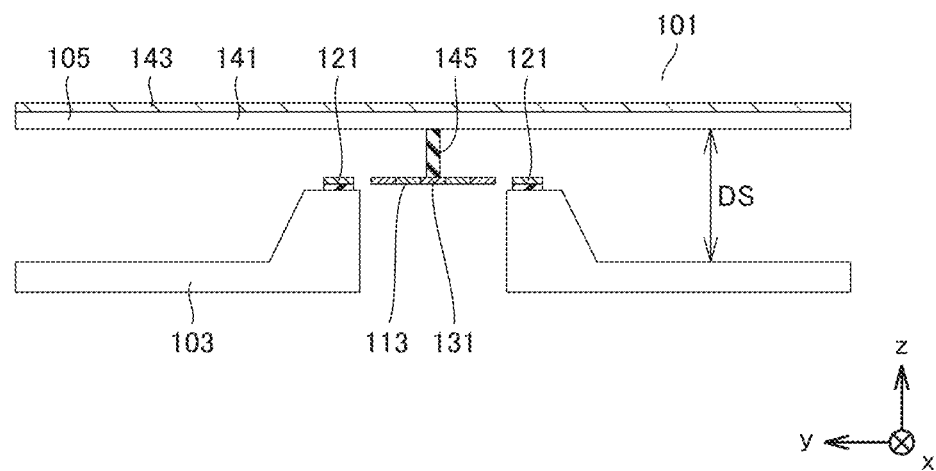
FIG. 22 is a sectional view illustrating an optical scanning device according to a comparative example.

An optical scanning device according to the comparative example will be described below. As illustrated in FIG. 22, an optical scanning device 101 of the comparative example includes a first structure 103 and a second structure 105. In first structure 103, a step of a silicon layer is provided on a side facing second structure 105. A driver 113 is disposed on an upper step portion of the step of the silicon layer with a beam 131 interposed therebetween. An electrode pad 121 is disposed on the upper step portion of the step. Second structure 105 is provided with a reflector 141, a metal film 143, and a columnar body 145. Columnar body 145 is bonded to driver 113.

Figure 23:
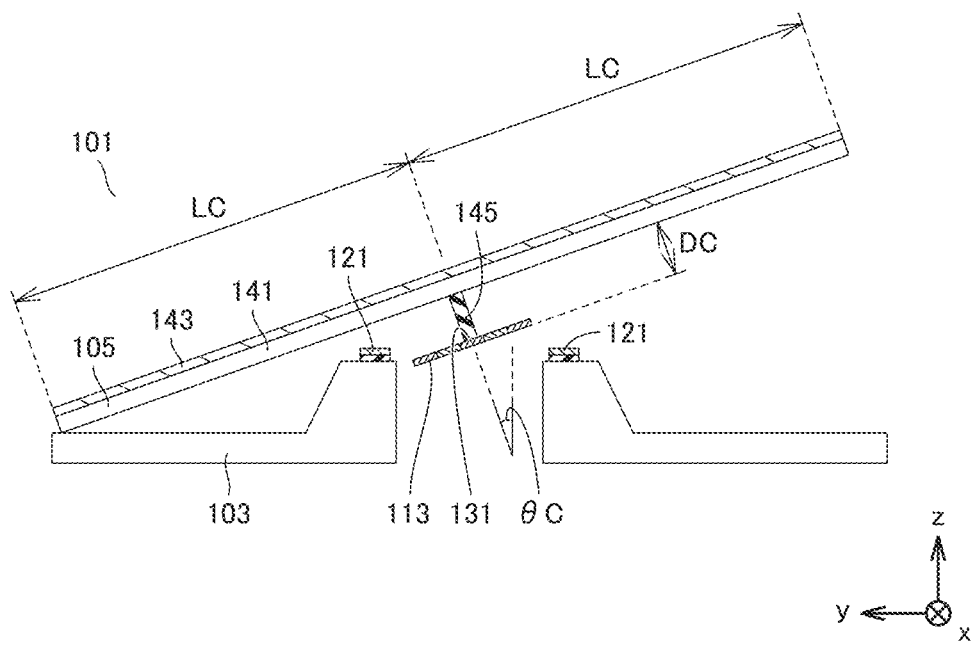
FIG. 23 is a sectional view illustrating one state in which the reflector of the optical scanning device of the comparative example is inclined.

As illustrated in FIG. 23, for example, a length LC that is a half of a length of reflector 141 in the Y axis direction is set to 5000 μm, and a distance DC from reflector 141 to beam 31 is set to 500 μm. At this point, considering the step of silicon, an inclination angle θC is assumed to be arctan (500/5000)≥5.7°.

However, in optical scanning device 101 of the comparative example, because first structure 103 is formed using a general SOI wafer, it is difficult to control a height of the step of silicon. For this reason, it is assumed that a distance DS in FIG. 22 between second structure 105 and the lower step portion of the step of silicon of first structure easily fluctuates, inclination angle θC varies, and inclination angle θC is hardly widen to a desired angle.

In contrast to the optical scanning device of the comparative example, in optical scanning device 1, first structure 3 is formed by processing first SOI substrate 61 (see FIG. 10) in which first semiconductor layer 63, first insulating film 65, and second semiconductor layer 67 are stacked and second insulating film 69. Support body 11a corresponding to the step is formed by etching first semiconductor layer 63 substantially using first insulating film 65 as an etching mask, and then removing first insulating film 65 (see FIG. 13).

For this reason, the height of support body 11a corresponding to the height of the step is the height corresponding to the thicknesses of first semiconductor layer 63 and first insulating film 65. Consequently, the variation in a distance DE between second structure 5 and flat section 11b of first structure 3 corresponding to the lower step portion of the step is eliminated, and the distance DE becomes substantially constant, and inclination angle θ1 can be easily widened to the desired angle.

In optical scanning device 101 of the comparative example, driver 113 and beam 131 are disposed at the same height position as the upper step portion of the step of first structure 103. Electrode pad 121 is disposed on the upper step portion of the step of first structure 103. In such a structure of optical scanning device 101, when a package (not illustrated) is disposed on the lower side of first structure 103, it is assumed that the wiring from electrode pad 121 to the package is hardly pulled out due to the existence of the step.

On the other hand, in optical scanning device 1 described above, electrode pad 21 is disposed on the side of the flat section 11b of first structure 3 opposite to the side on which second structure 5 is located. This enables to pull out the wiring from electrode pad 21 to the package. This will be described in a third embodiment.

Second Embodiment

Figure 24:
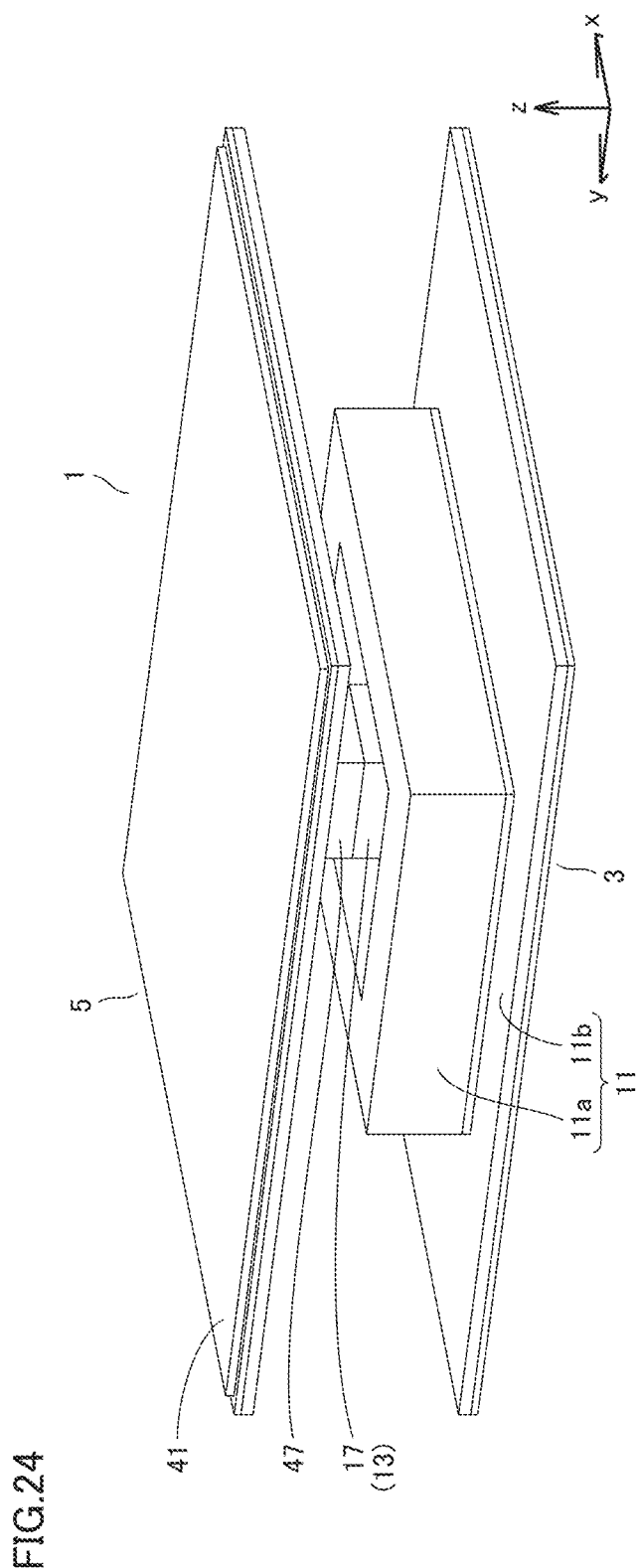
FIG. 24 is a perspective view illustrating an optical scanning device according to a second embodiment.

An optical scanning device according to a second embodiment will be described. As illustrated in FIG. 24, optical scanning device 1 of the second embodiment includes first structure 3 and second structure 5. First structure 3 includes a first columnar body 17, and second structure 5 includes a second columnar body 45. A bonding surface 17a (see FIG. 25) of first columnar body 17 is bonded to a bonding surface 47a (see FIG. 26) of a second columnar body 47.

Figure 25:
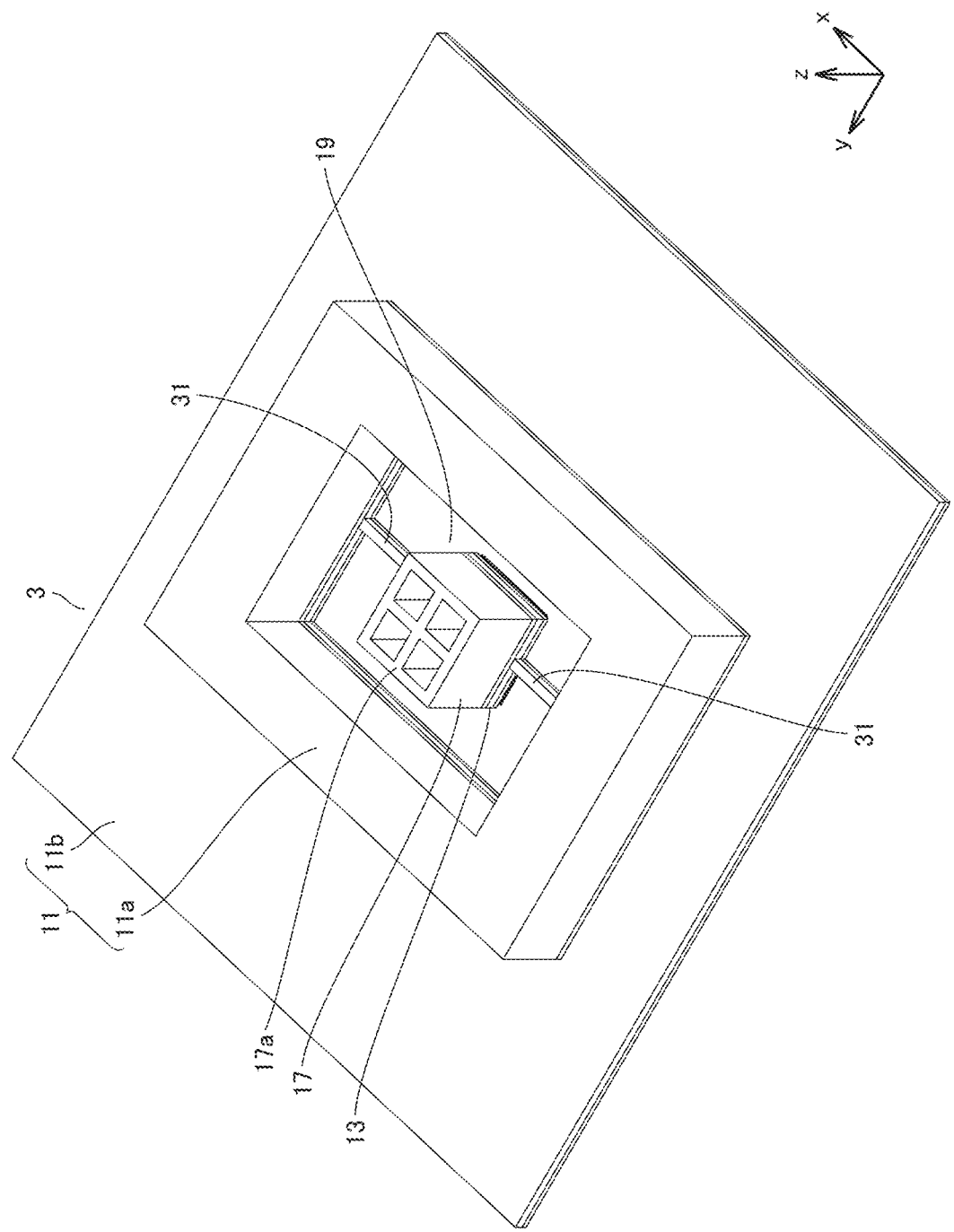
FIG. 25 is a perspective view illustrating a first structure in the optical scanning device of the second embodiment.
Figure 26:
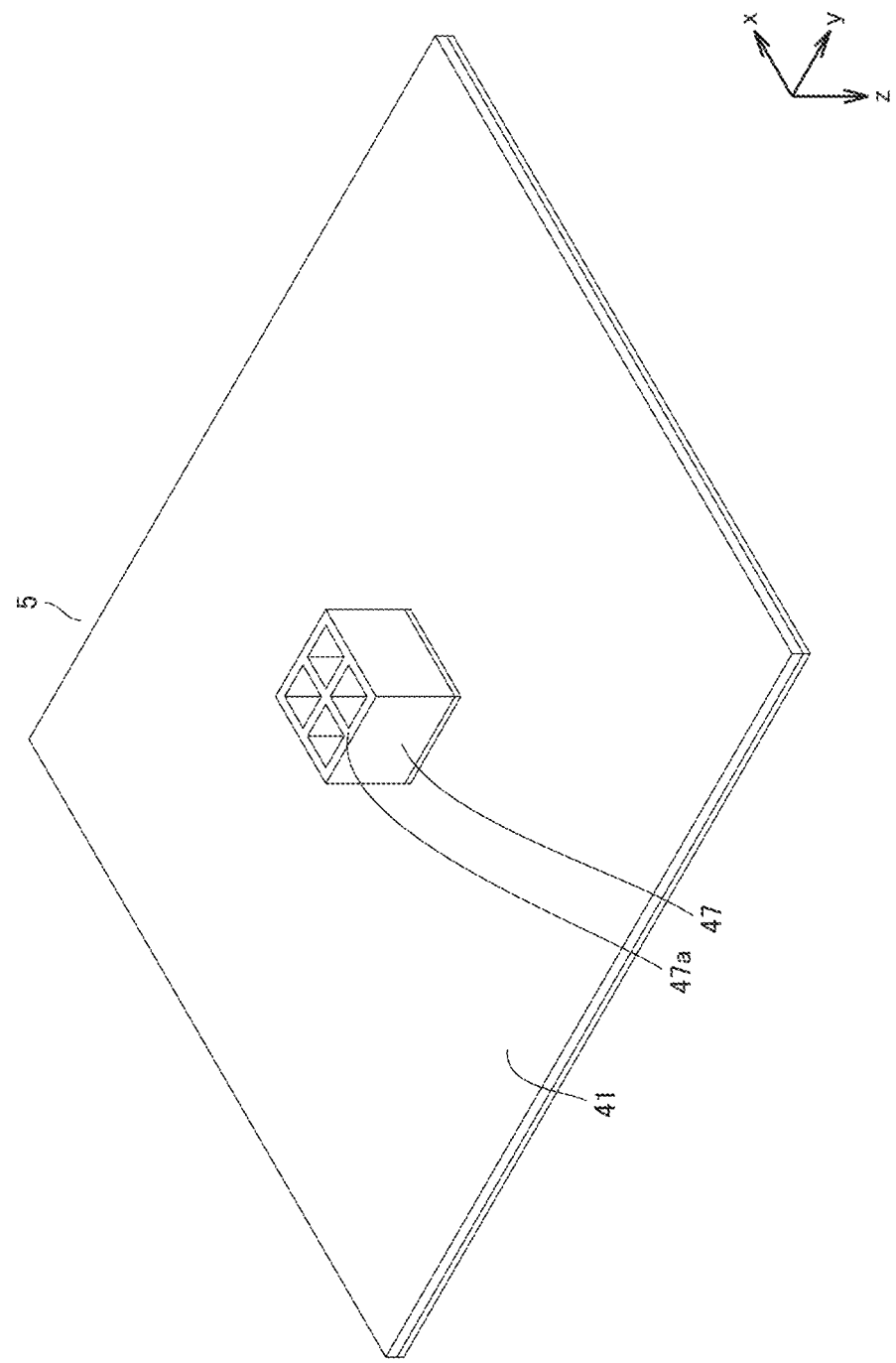
FIG. 26 is a perspective view illustrating a second structure in the optical scanning device in the second embodiment.

The structures of first columnar body 17 and second columnar body 47 will be specifically described. As illustrated in FIG. 25, first columnar body 17 has a rib structure in which a rib is formed. As illustrated in FIG. 26, second columnar body 47 also has the rib structure in which the rib is formed. Because other configurations are similar to those of optical scanning device 1 in FIG. 1 and the like, the same member is denoted by the same reference numeral, and the description will be omitted unless necessary.

An example of a method for manufacturing optical scanning device 1 will be described below. Optical scanning device 1 of the second embodiment is manufactured by basically the same processes as the method for manufacturing optical scanning device 1 of the first embodiment except for the process of forming each of first columnar body 17 and second columnar body 47.

First columnar body 17 is formed in a process corresponding to the process in FIG. 13. A pattern (not illustrated) of the resist film is formed by performing the photomechanical processing. At this point, the pattern of the resist film corresponding to the rib is formed in the region where the first columnar body is formed.

Then, the etching processing is performed on first semiconductor layer 63 and first insulating film 65 using the pattern of the resist film as the protective film, whereby first columnar body 17 (see FIG. 25) having the rib structure is formed together with support body 11a.

On the other hand, second columnar body 47 is formed in a process corresponding to the process in FIG. 17. A resist film pattern (not illustrated) is formed by performing the photomechanical processing. At this point, the pattern of the resist film corresponding to the rib is formed in the region where the second columnar body is formed.

Then, the etching processing is performed on third semiconductor layer 83 and third insulating film 85 using the pattern of the resist film as the protective film, whereby second columnar body 47 (see FIG. 26) having the rib structure is formed.

The operation of optical scanning device 1 described above will be described below. In optical scanning device 1 of the second embodiment, similarly to optical scanning device 1 of the first embodiment, reflector 41 is inclined in a desired direction by the Lorentz force.

In optical scanning device 1 of the second embodiment, the following effects can be obtained in addition to the effects of optical scanning device 1 of the first embodiment.

That is, each of first columnar body 17 and second columnar body 47 has the rib structure having a hollow portion, so that weight of first structure 3 and second structure 5 can be reduced while the strength of first columnar body 17 and second columnar body 47 is maintained as a post. This allows reflector 41 to be inclined at the desired angle by the smaller Lorentz force.

In optical scanning device 1 of the second embodiment, the structure in which the ribs of first columnar body 17 and second columnar body 47 are disposed in the cross shape is described as an example. The rib structure is not limited to the case where the rib is disposed in the cross shape as long as the rib structure has the hollow portion and can secure the strength as the post.

Third Embodiment

Figure 27:
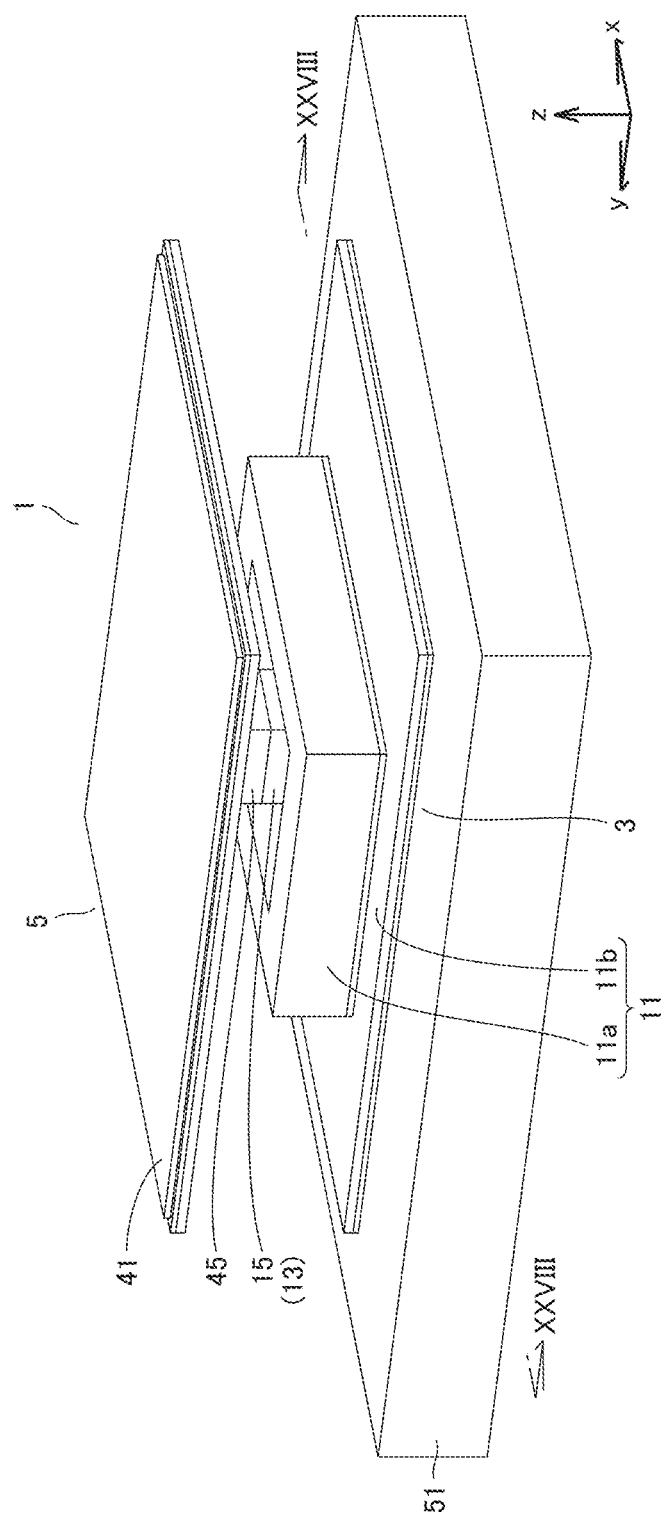
FIG. 27 is a perspective view illustrating an optical scanning device according to a third embodiment.
Figure 28:
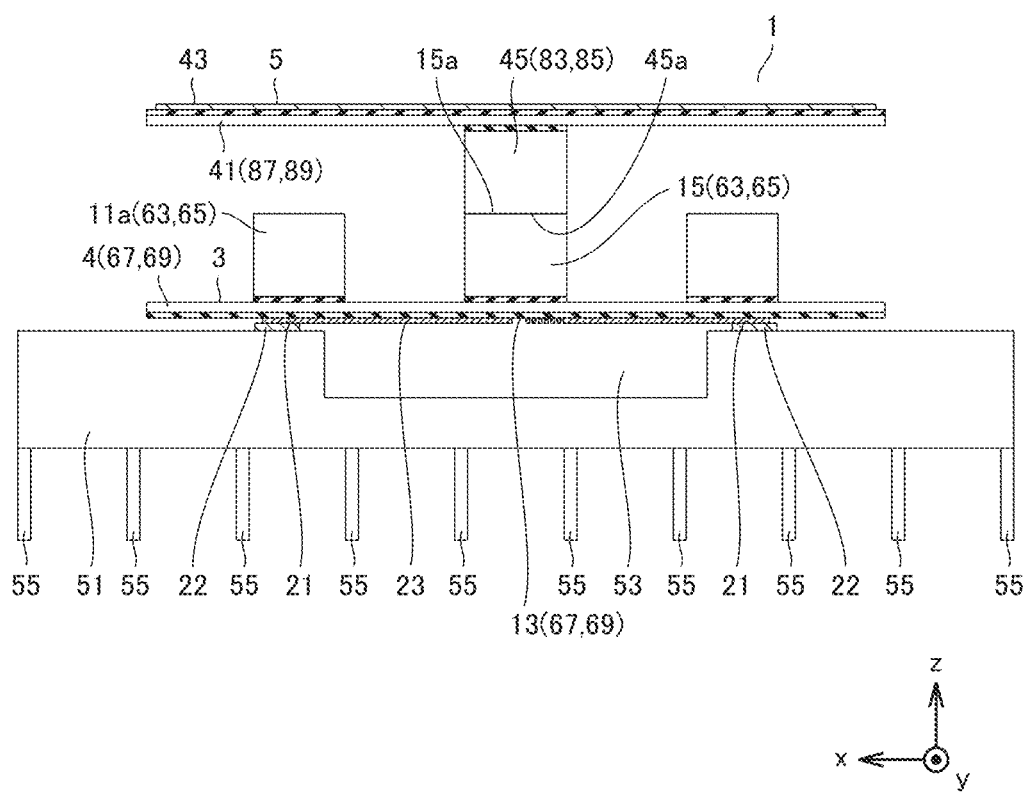
FIG. 28 is a sectional view taken along a line XXVIII-XXVIII in FIG. 27 in the third embodiment.

An optical scanning device according to a third embodiment will be described below. As illustrated in FIGS. 27 and 28, optical scanning device 1 is mounted on a package 51. Electrode pad 21 provided on first structure 3 of optical scanning device 1 is bonded to electrode pad 22 arranged in package 51. For example, ceramic or the like is used as a material of package 51. A sufficient gap 53 in which driver 13 rotates is formed in package 51. A plurality of metal pins 55 electrically connected to electrode pads 22 are installed in package 51. Pins 55 are used for electrically connecting to a control board or the like on which a control integrated circuit (IC) controlling optical scanning device 1 is mounted, the control board or the like being configured separately from package 51. Because other configurations are similar to those of optical scanning device 1 in FIG. 1 and the like, the same member is denoted by the same reference numeral, and the description will be omitted unless necessary.

An example of a method for manufacturing optical scanning device 1 mounted on package 51 will be described below. After the series of manufacturing processes in FIGS. 9 to 19 described in the first embodiment, electrode pad 21 provided in first structure 3 and electrode pad 22 disposed in package 51 are bonded by, for example, diffusion bonding between metals by heat. Thus, optical scanning device 1 is mounted on package 51.

The operation of optical scanning device 1 described above will be described below. In optical scanning device 1 of the second embodiment, similarly to optical scanning device 1 of the first embodiment, reflector 41 is inclined in a desired direction by the Lorentz force.

In optical scanning device 1 of the second embodiment, the following effects can be obtained in addition to the effects of optical scanning device 1 of the first embodiment.

In the structure in which the electrode pad is disposed on the side on which second structure 5 is located in flat section 11b of first structure 3, in order to electrically connect the electrode pad and the electrode pad of the package, it is necessary to provide wiring drawn out to the side of package 51 in flat section 11b by providing a through via penetrating flat section 11b.

On the other hand, when electrode pad 21 is disposed on the side opposite to the side where second structure 5 is located in flat section 11b of first structure 3, it is not necessary to provide the through via, and electrode pad 21 and electrode pad 22 of package 51 can be electrically easily connected together by diffusion bonding between metals.

Fourth Embodiment

An optical scanning device according to a fourth embodiment will be described below. In optical scanning device 1 of the first to third embodiments, the case where reflector 41 is inclined by the Lorentz force is described (see FIG. 1 and the like).

Here, an optical scanning device that inclines the reflector by the electrostatic force will be described.

Figure 29:
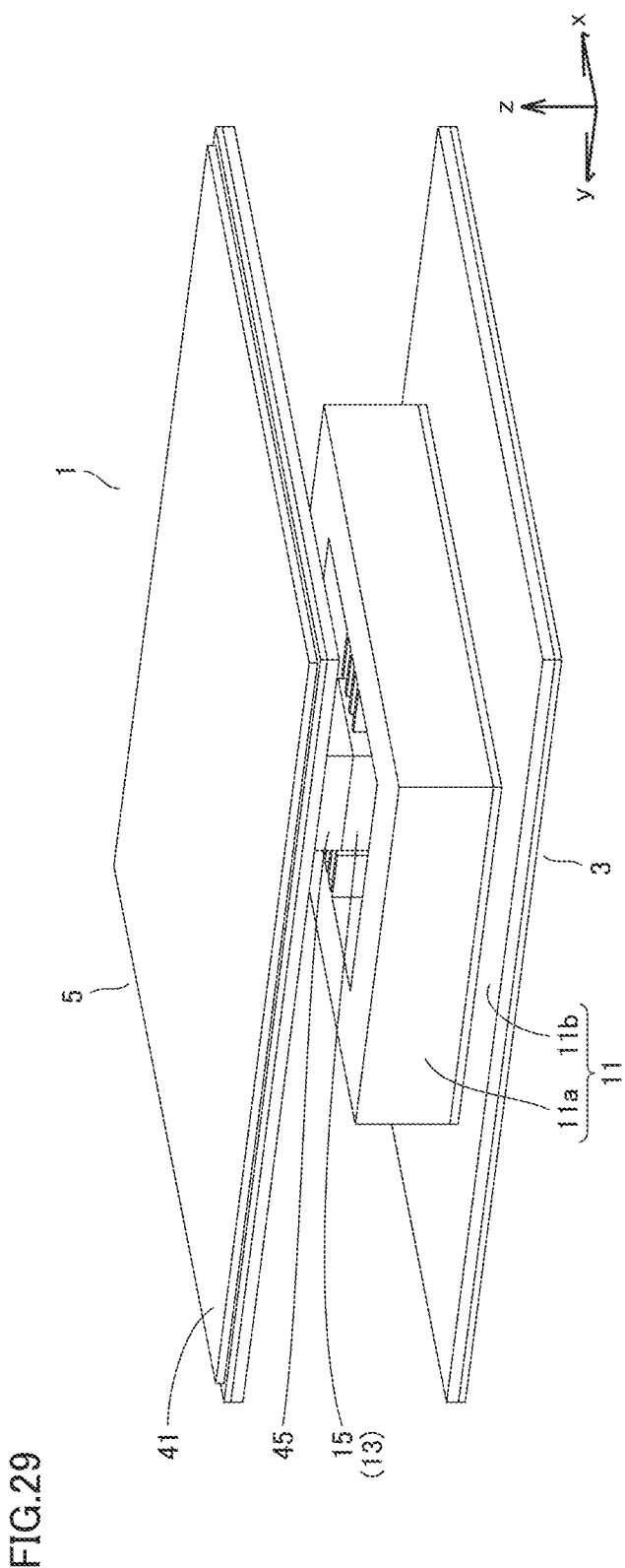
FIG. 29 is a perspective view illustrating an optical scanning device according to a fourth embodiment.
Figure 30:
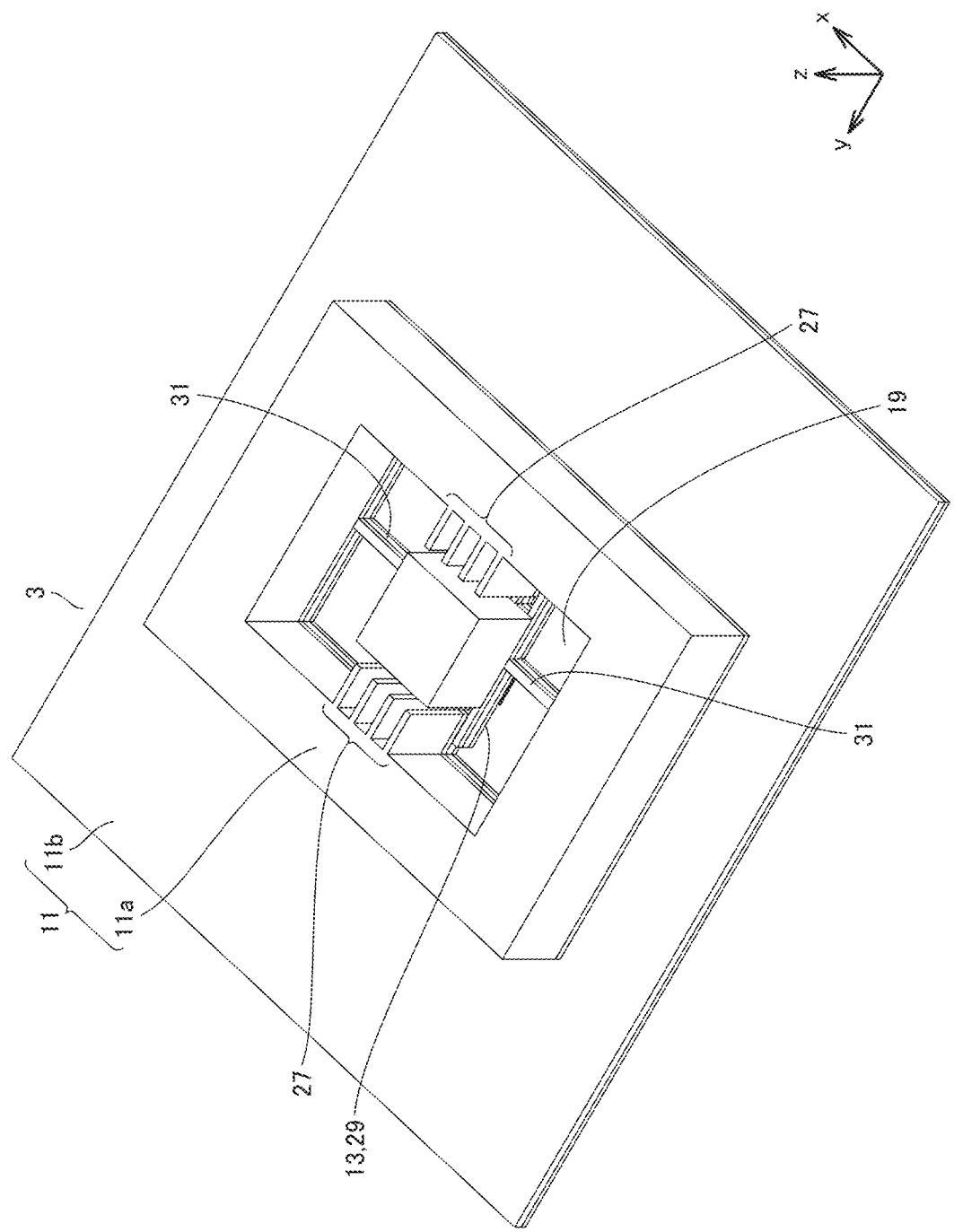
FIG. 30 is a perspective view illustrating a first structure in the optical scanning device of the fourth embodiment.

As illustrated in FIG. 29, in optical scanning device 1, optical scanning device 1 of the fourth embodiment includes first structure 3 and second structure 5. Second columnar body 45 of second structure 5 is connected to first columnar body 15 of first structure 3. As illustrated in FIG. 30, first structure 3 is provided with a fixed interdigital electrode 27 and a movable interdigital electrode 29 as driving section 19 that inclines reflector 41 of the second structure.

Fixed interdigital electrode 27 is formed on support 11. Movable interdigital electrode 29 is formed in driver 13. Because other configurations are similar to those of optical scanning device 1 in FIG. 1 and the like, the same member is denoted by the same reference numeral, and the description will be omitted unless necessary.

Figure 31:
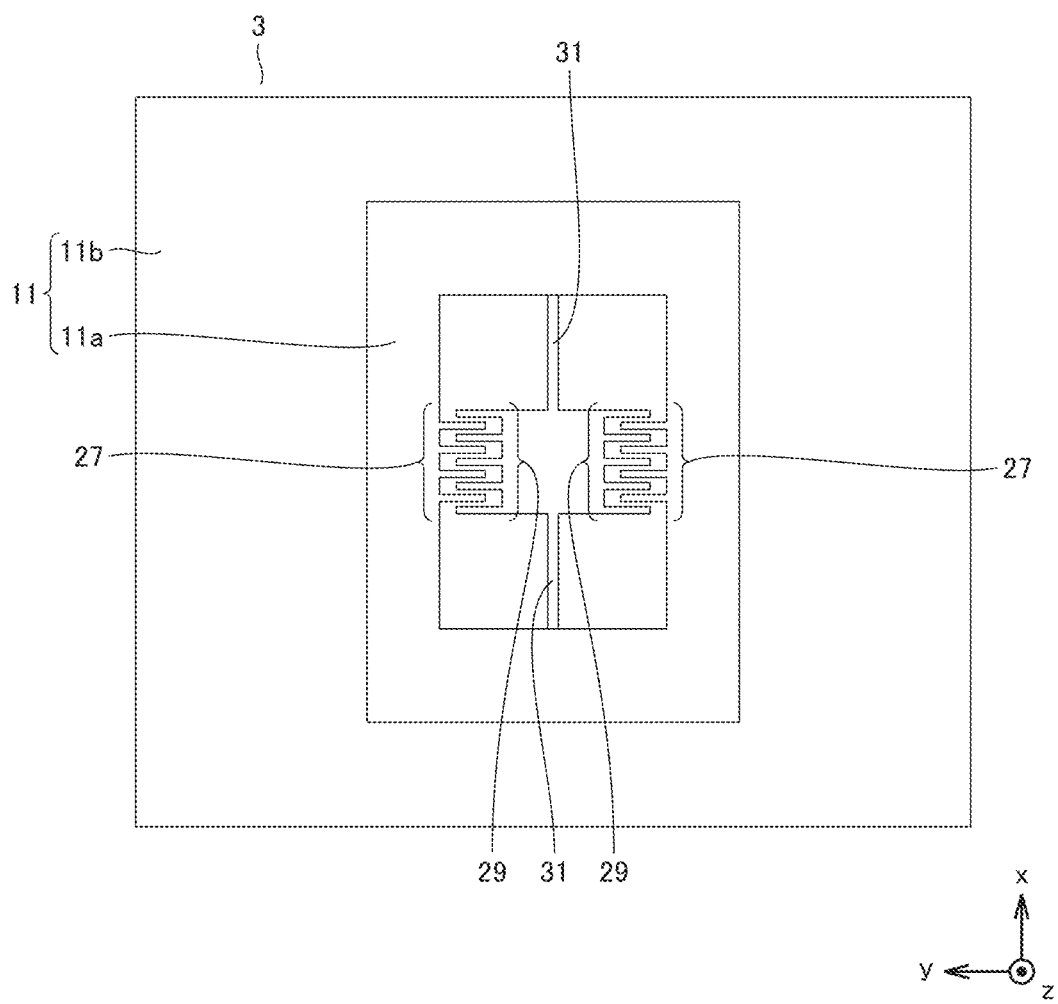
FIG. 31 is a plan view illustrating the first structure in the optical scanning device of the fourth embodiment.
Figure 32:
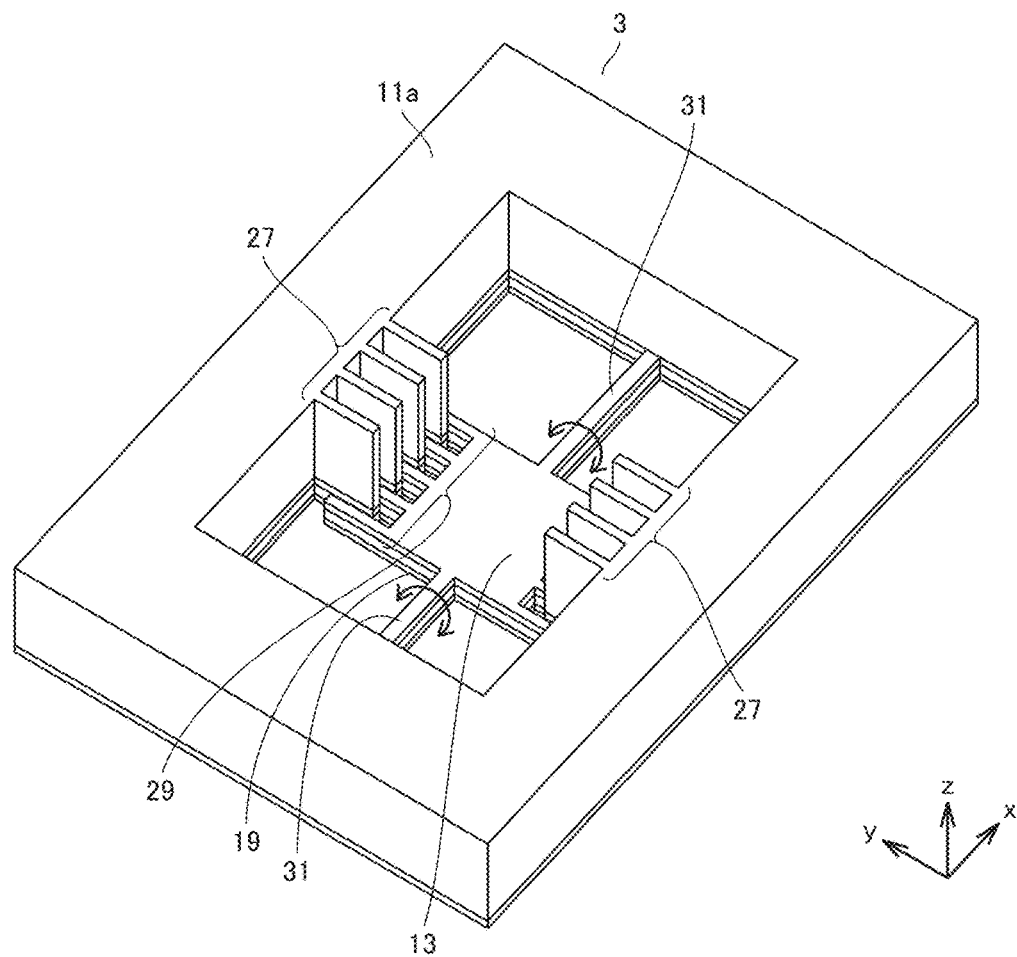
FIG. 32 is a partially enlarged perspective view illustrating a fixed interdigital electrode and a movable interdigital electrode in the first structure of the fourth embodiment.

First structure 3 will be described in detail. As illustrated in FIGS. 31 and 32, fixed interdigital electrode 27 and movable interdigital electrode 29 are disposed such that comb teeth of fixed interdigital electrode 27 and comb teeth of movable interdigital electrode 29 alternately mesh with each other. In FIGS. 31 and 32, first columnar body 15 in FIG. 29 is omitted such that the structures of fixed interdigital electrode 27 and movable interdigital electrode 29 can be easily visually recognized.

An example of a method for manufacturing optical scanning device 1 will be described below. Optical scanning device 1 of the fourth embodiment is manufactured by basically the same processes as the method for manufacturing optical scanning device 1 of the first embodiment except for the process of patterning driver 13 and flat section 11b and the process of patterning support body 11a.

Fixed interdigital electrode 27 is formed in processes corresponding to the processes in FIGS. 11 and 13. In the process corresponding to the process in FIG. 11, the pattern (not illustrated) of the resist film is formed by performing the photomechanical processing. At this point, the pattern of the resist film corresponding to the fixed interdigital electrode is formed in the region where a planar portion is formed. The pattern of the resist film corresponding to the movable interdigital electrode is formed in the region where a movable body is formed.

Then, second insulating film 69 and second semiconductor layer 67 are etched using the pattern of the resist film as the protective film. Consequently, a part of fixed interdigital electrode 27 is patterned, and movable interdigital electrode 29 is patterned.

Then, in a process corresponding to the process in FIG. 13, the photomechanical processing is performed to form a pattern (not shown) of the resist film. At this point, the pattern of the resist film corresponding to fixed interdigital electrode 27 is formed in the region where the support body is formed.

Then, the etching processing is performed on first semiconductor layer 63 and first insulating film 65 using the pattern of the resist film as the protective film. Consequently, the remaining portion of the fixed interdigital electrode is patterned to form entire fixed interdigital electrode 27.

Figure 33:
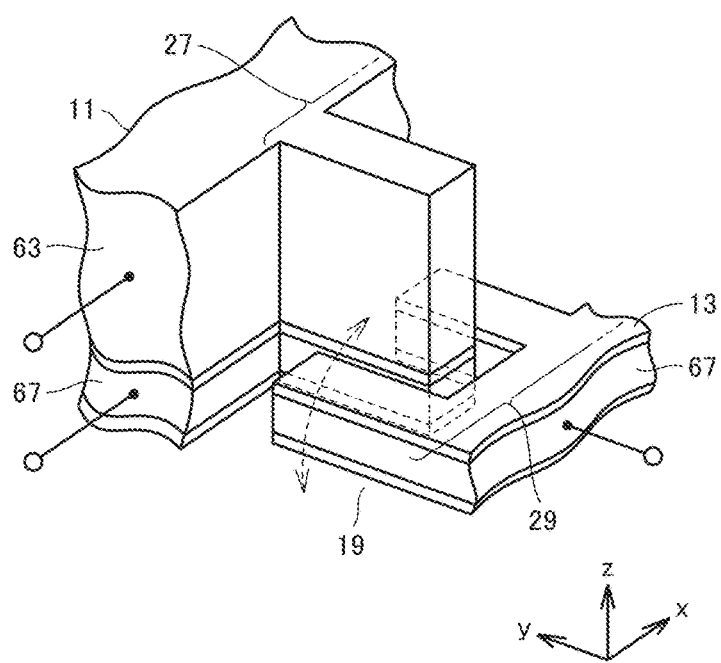
FIG. 33 is a partially enlarged sectional perspective view illustrating the fixed interdigital electrode and the movable interdigital electrode for the purpose of describing the operation of the optical scanning device of the fourth embodiment.

The operation of optical scanning device 1 described above will be described below. As illustrated in FIGS. 32 and 33, voltage applied to fixed interdigital electrode 27 (the portion of first semiconductor layer 63) is changed based on voltage applied to movable interdigital electrode 29 (the portion of second semiconductor layer 67), whereby the electrostatic force (attractive force or repulsive force) is generated between movable interdigital electrode 29 and fixed interdigital electrode 27. The electrostatic force causes driver 13 including movable interdigital electrode 29 to rotate about beam 31 (see arc-shaped arrows in FIGS. 32 and 33).

In optical scanning device 1 of the second embodiment, the following effects can be obtained in addition to the effects of optical scanning device 1 of the first embodiment. That is, in optical scanning device 1 of the fourth embodiment, in driving section 19, reflector 41 is inclined by the electrostatic force. Consequently, a space where the magnet is disposed can be reduced, thereby further contributing to the downsizing of optical scanning device 1.

The optical scanning device described in respective embodiments can be combined in various ways as necessary.

The above embodiments are only by way of example, and the present invention is not limited to the above embodiment. The scope of the present invention is defined by not the above description, but the claims, and it is intended that all modifications within the meaning and scope of the claims are included in the present invention.

INDUSTRIAL APPLICABILITY

The present invention is effectively used in the MEMS mirror type optical scanning device.

REFERENCE SIGNS LIST

1: optical scanning device, 3: first structure, 5: second structure, 11: support, 11a: support body, 11b: flat section, 13: driver, 15: first columnar body, 15a: bonding surface, 17: first columnar body, 17a: bonding surface, 19: driving section, 21, 22: electrode pad, 23: coil, 25: magnet, 27: fixed interdigital electrode, 29: movable interdigital electrode, 31: beam, 51: package, 53: void, 55: pin, 41: reflector, 43: metal film, 43a: reflection surface, 45: second columnar body, 45a: bonding surface, 47: second columnar body, 47a: bonding surface, 61: first SOI substrate, 63: first semiconductor layer, 65: first insulating film, 67: second semiconductor layer, 69: second insulating film, 71: first protective resist film, 73: first wax, 74: first dummy wafer, 81: second SOI substrate, 83: third semiconductor layer, 85: third insulating film, 87: fourth semiconductor layer, 89: fourth insulating film, 91: second protective resist film, 93: second wax, 95: second dummy wafer

The invention claimed is:

1. An optical scanning device comprising:
a first structure and
a second structure, wherein
the first structure includes:
 a support, wherein the support includes a support body and a flat section connected to the support body and extending further outward from an outer periphery of the support body;
 a beam connected to the flat section;
 a driver rotatably connected to the flat section with the beam interposed therebetween;

a first columnar body connected to the driver and having a height corresponding to a thickness of the support body; and
a driving section configured to rotate the driver using the beam as an axis,
the second structure includes:
a reflector disposed so as to face the support; and
a second columnar body connected to the reflector and connected to the first columnar body, and
the beam is disposed in a part, opposite to a side where the second structure is disposed, in the support.

2. The optical scanning device according to claim 1, wherein a thickness of the flat section is smaller than the thickness of the support body.

3. The optical scanning device according to claim 1, wherein the flat section, the beam and the driver are formed from the same layer.

4. The optical scanning device according to claim 1, wherein
the driving section includes:
a coil disposed in the driver;
an electrode pad electrically connected to the coil; and
a magnet having a magnetic line of force in a direction intersecting with a direction of a current flowing through the coil, and
the driver is rotated by Lorentz force generated by action of the current and the magnetic line of force.

5. The optical scanning device according to claim 4, wherein in the support, the electrode pad is disposed on a side opposite to a side on which the second structure is located.

6. The optical scanning device according to claim 5, further comprising a package in which another electrode pad is disposed, wherein the electrode pad is bonded to the other electrode pad.

7. The optical scanning device according to claim 1, wherein
the driving section includes:
a first interdigital electrode provided on the support; and
a second interdigital electrode that is provided on the driver and disposed so as to alternately mesh with the first interdigital electrode,
voltage is applied to each of the first interdigital electrode and the second interdigital electrode, and
the driver is rotated by electrostatic force generated between the first interdigital electrode and the second interdigital electrode.

8. The optical scanning device according to claim 1, wherein
the first columnar body has a first rib structure, and
the second columnar body has a second rib structure.

9. The optical scanning device according to claim 1, wherein
the reflector includes a reflection surface on a side opposite to a side on which the first structure is located, and
a first length of the reflection surface in a first direction intersecting with a direction in which the beam extends is longer than a second length of the support body in the first direction.

10. The optical scanning device according to claim 1, wherein
the flat section includes a semiconductor layer, and
the support body includes an insulating film that is in contact with the semiconductor layer.

11. The optical scanning device according to claim 1, wherein
the first structure is formed of:
a first SOI substrate in which a first semiconductor layer, a first insulating film, and a second semiconductor layer are stacked; and
a second insulating film formed so as to be in contact with the second semiconductor layer,
the support is formed of a part of each of the first semiconductor layer, the first insulating film, the second semiconductor layer, and the second insulating film,
the first columnar body is formed of another part of each of the first semiconductor layer and the first insulating film,
the second structure is formed of:
a second SOI substrate in which a third semiconductor layer, a third insulating film, and a fourth semiconductor layer are stacked; and
a fourth insulating film formed so as to be in contact with the fourth semiconductor layer,
the reflector is formed of a part of each of the fourth semiconductor layer and the fourth insulating film, and
the second columnar body is formed of a part of each of the third semiconductor layer and the third insulating film.

12. A method for manufacturing an optical scanning device including a first structure and a second structure, wherein
forming the first structure includes:
preparing a first substrate in which a first semiconductor layer, a first insulating film, a second semiconductor layer, and a second insulating film are sequentially stacked;
forming a driving section on a side of the second insulating film in the first substrate;
processing the second insulating film and the second semiconductor layer, and forming a driver driven by the driving section, a flat section, and a beam connecting the driver and the flat section by respective parts of the second insulating film and the second semiconductor layer; and
processing the first semiconductor layer and the first insulating film, and forming a support including a support body connected to the flat section and a first columnar body connected to the driver by respective parts of the first insulating film and the first semiconductor layer,
forming the support body connected to the flat section includes forming the support body so that the flat section extends further outward from an outer periphery of the support body,
forming the first columnar body includes forming the first columnar body having a height corresponding to a thickness of the support body,
forming the second structure includes:
preparing a second substrate in which a third semiconductor layer, a third insulating film, a fourth semiconductor layer, and a fourth insulating film are sequentially stacked; and
processing the third semiconductor layer and the third insulating film, forming a reflector by respective parts of the fourth semiconductor layer and the fourth insulating film, and forming a second columnar body connected to the reflector by respective parts of the third semiconductor layer and the third insulating film, and
the method comprises bonding the first columnar body and the second columnar body such that the reflector faces the support after the first structure and the second structure are formed.

13. The method for manufacturing the optical scanning device according to claim 12, wherein forming the driving section includes:
   forming a coil on a part of the second insulating film that becomes the driver;
   forming an electrode pad electrically connected to the coil on a part of the second insulating film that becomes the flat section; and
   disposing a magnet that generates a magnetic line of force in a direction intersecting with a direction of current flowing through the coil.

14. The method for manufacturing the optical scanning device according to claim 12, wherein forming the driving section includes:
   forming a first interdigital electrode in a part of each of the first semiconductor layer, the first insulating film, the second semiconductor layer, and the second insulating film that become the support; and
   forming a second interdigital electrode in respective parts of the second insulating film, the second semiconductor layer, and the first insulating film that become the driver so as to alternately mesh with the first interdigital electrode.

15. The method for manufacturing the optical scanning device according to claim 12, wherein
   forming the first columnar body includes forming a first rib structure by performing etching processing on the first semiconductor layer, and
   forming the second columnar body includes forming a second rib structure by performing etching processing on the third semiconductor layer.

16. The optical scanning device according to claim 1, wherein
   the first structure is formed of:
      a first SOI substrate in which a first semiconductor layer, a first insulating film, and a second semiconductor layer are stacked; and
      a second insulating film formed so as to be in contact with the second semiconductor layer,
   the support is formed of a part of each of the first semiconductor layer, the first insulating film, the second semiconductor layer, and the second insulating film,
   the first columnar body is formed of another part of each of the first semiconductor layer and the first insulating film.

17. The optical scanning device according to claim 1, wherein
   the second structure is formed of:
      a second SOI substrate in which a third semiconductor layer, a third insulating film, and a fourth semiconductor layer are stacked; and
      a fourth insulating film formed so as to be in contact with the fourth semiconductor layer,
   the reflector is formed of a part of each of the fourth semiconductor layer and the fourth insulating film, and
   the second columnar body is formed of a part of each of the third semiconductor layer and the third insulating film.

18. The optical scanning device according to claim 1, wherein a thickness of the beam connected to the flat section is equal to a thickness of the flat section.

* * * * *